United States Patent
Wang et al.

(10) Patent No.: US 10,622,915 B2
(45) Date of Patent: Apr. 14, 2020

(54) FOUR-QUADRANT MODULATION TECHNIQUE TO EXTEND MODULATION INDEX RANGE FOR MULTILEVEL SELECTIVE HARMONIC ELIMINATION / COMPENSATION

(71) Applicant: UNIVERSITY OF FLORIDA RESEARCH FOUNDATION, INCORPORATED, Gainesville, FL (US)

(72) Inventors: Shuo Wang, Gainesville, FL (US); Hui Zhao, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 0 days.

(21) Appl. No.: 16/323,869

(22) PCT Filed: Aug. 9, 2017

(86) PCT No.: PCT/US2017/046079
§ 371 (c)(1),
(2) Date: Feb. 7, 2019

(87) PCT Pub. No.: WO2018/031642
PCT Pub. Date: Feb. 15, 2018

(65) Prior Publication Data
US 2019/0260307 A1  Aug. 22, 2019

Related U.S. Application Data

(60) Provisional application No. 62/373,663, filed on Aug. 11, 2016.

(51) Int. Cl.
| | | |
|---|---|---|
| H02M 7/487 | (2007.01) | |
| H02M 1/08 | (2006.01) | |
| H02M 1/12 | (2006.01) | |
| H02M 7/483 | (2007.01) | |

(52) U.S. Cl.
CPC ............ *H02M 7/487* (2013.01); *H02M 1/08* (2013.01); *H02M 1/12* (2013.01); *H02M 2007/4835* (2013.01)

(58) Field of Classification Search
CPC ......... H02M 7/487; H02M 2007/4835; H02M 1/12; H02M 1/08
See application file for complete search history.

(56) References Cited

U.S. PATENT DOCUMENTS

| | | | |
|---|---|---|---|
| 4,344,123 A | 8/1982 | Bhagwat et al. | |
| 5,642,275 A * | 6/1997 | Peng ...................... | H02M 7/49 363/137 |

(Continued)

FOREIGN PATENT DOCUMENTS

| | | |
|---|---|---|
| CN | 104038076 A | 9/2014 |
| EP | 0336019 A1 | 10/1989 |

(Continued)

OTHER PUBLICATIONS

International Searching Authority, International Search Report for International Application No. PCT/US2017/046079, dated Nov. 20, 2017, 4 pages, Korean Intellectual Property Office.

(Continued)

*Primary Examiner* — Jue Zhang
(74) *Attorney, Agent, or Firm* — Alston & Bird LLP

(57) ABSTRACT

Four quadrant modulation techniques that can synthesize a full range solution or a full modulation index range are provided. Such techniques can be applied to a DC/AC inverter, an AC to DC rectifier, and AC/DC/AC topology. The techniques can also be applied to a neutral point clamped (NPC) topology, flying capacitor (FLC) topology, cascaded H-bridge (CHB) topology, modular multilevel topology, modular multilevel converters, and multimodule converters.

20 Claims, 10 Drawing Sheets

(56) References Cited

U.S. PATENT DOCUMENTS

| | | | |
|---|---|---|---|
| 6,075,350 A | | 6/2000 | Peng et al. |
| 9,473,042 B1* | | 10/2016 | Chu ................. H02M 7/44 |
| 2012/0081061 A1* | | 4/2012 | Zargari ............. H02J 3/01 |
| | | | 318/503 |
| 2014/0133198 A1 | | 5/2014 | Koyama et al. |
| 2014/0226373 A1 | | 8/2014 | Park et al. |
| 2014/0362618 A1* | | 12/2014 | Hassan ............ H02J 3/1857 |
| | | | 363/35 |
| 2015/0214727 A1 | | 7/2015 | Chen et al. |
| 2015/0333612 A1* | | 11/2015 | Hasler ............. H02M 1/12 |
| | | | 363/39 |
| 2016/0380556 A1* | | 12/2016 | Peng ............... H02M 1/12 |
| | | | 363/71 |

FOREIGN PATENT DOCUMENTS

| | | |
|---|---|---|
| JP | 2016010290 A | 1/2016 |
| KR | 101410731 B1 | 6/2014 |

OTHER PUBLICATIONS

Y. Chu, S. Wang, and R. Crosier, "Grid active power filters using cascaded multilevel inverters with direct asymmetric switching angle control for grid support functions," in Applied Power Electronics Conference and Exposition (APEC), 2013 Twenty-Eighth Annual IEEE, 2013, pp. 1332-1338.

H. Zhao and S. Wang, "A real-time selective harmonic compensation (SHC) based on asymmetric switching angle modulation and current feedback control for cascaded modular multilevel inverters," presented at the 2015 IEEE Applied Power Electronics Conference and Exposition (APEC), 2015.

H. Zhao, T. Jin, S. Wang, and L. Sun, "A Real-Time Selective Harmonic Elimination Based on a Transient-Free Inner Closed-Loop Control for Cascaded Multilevel Inverters," IEEE Transactions on Power Electronics, vol. 31, pp. 1000-1014, 2016.

J. N. Chiasson, L. M. Tolbert, K. J. McKenzie, and D. Zhong, "A complete solution to the harmonic elimination problem," Power Electronics, IEEE Transactions on, vol. 19, pp. 491-499, 2004.

M. S. A. Dahidah, G. Konstantinou, N. Flourentzou, and V. G. Agelidis, "On comparing the symmetrical and non-symmetrical selective harmonic elimination pulse-width modulation technique for two-level three-phase voltage source converters," Power Electronics, IET, vol. 3, pp. 829-842, 2010.

D. Hong, S. Bai, and S. M. Lukic, "Closed-Form Expressions for Minimizing Total Harmonic Distortion in Three-Phase Multilevel Converters," Power Electronics, IEEE Transactions on, vol. 29, pp. 5229-5241, 2014.

* cited by examiner (a) Nonlinear load harmonic current envelope and harmonic standard (b) Derived constraints and CHB harmonic envelope.

(a) Simulated waveform (b) Experimental waveform (c) Simulated Spectrum of $I_{CHB}$ (d) Experimental Spectrum of $I_{CHB}$

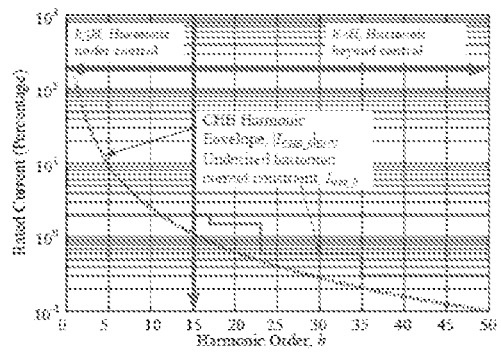
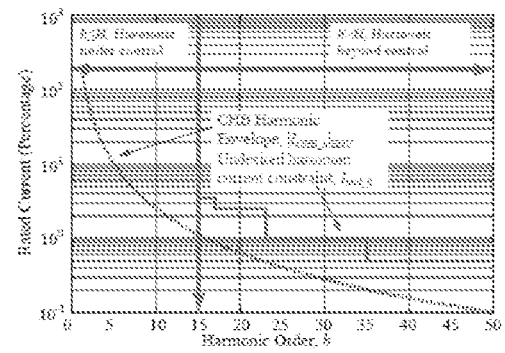
Figure 17
Figure 18
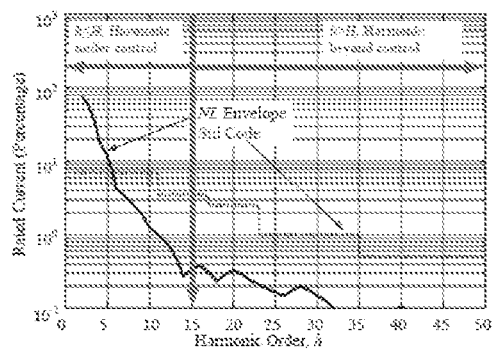
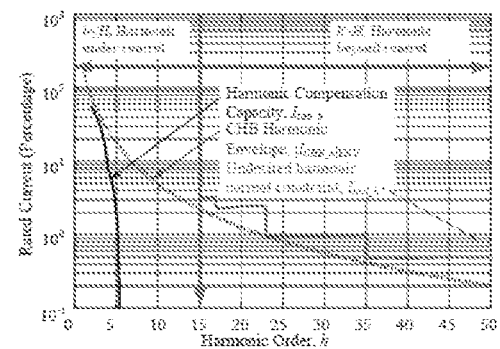
Figure 19(a)
Figure 19(b)
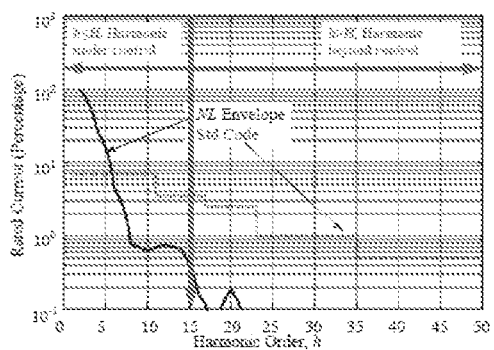
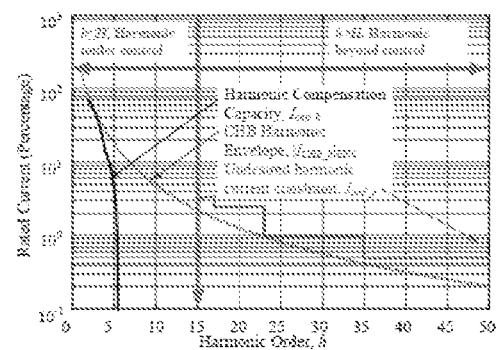
Figure 20(a)
Figure 20(b)

FOUR-QUADRANT MODULATION TECHNIQUE TO EXTEND MODULATION INDEX RANGE FOR MULTILEVEL SELECTIVE HARMONIC ELIMINATION / COMPENSATION

CROSS REFERENCE TO RELATED APPLICATIONS

This application is a National State Application, filed under 35 U.S.C. § 371, of International Application No. PCT/US2017/046079, filed Aug. 9, 2017, which claims the benefit of U.S. Provisional Patent Application Ser. No. 62/373,663, filed Aug. 11, 2016, the entire contents of which are incorporated herein in their entireties by reference.

GOVERNMENT SUPPORT

This invention was made with government support under grant No. 1540118 awarded by the National Science Foundation. The government has certain rights in the invention.

BACKGROUND OF THE INVENTION

Multilevel converters/inverters, including neutral point clamped (NPC), flying capacitor (FLC), cascaded H-bridge (CHB) and modular multilevel converters/inverters, have drawn attention in recent years, especially in medium and high voltage/power applications, such as motor drive systems, traction, PV inverters and battery charging stations. Their advantages include high reliability, low voltage stress, low electromagnetic interference (EMI) and low common-mode voltages. Pulse width modulation (PWM) modulation techniques, including selective harmonic elimination (SHE) and selective harmonic compensation (SHC), have been applied in multilevel converters/inverters to achieve high performance with low switching frequencies in various applications such as static synchronous compensators and active power filters (APF). In these techniques, the transcendental equations to be solved are developed based on voltage/current references, total harmonic distortion (THD) requirements and other objectives with the help of Fourier transformation.

Techniques including iterative numerical algorithms, online calculations and the complete solution have been proposed to solve the transcendental equations. However, the effective modulation index range of these techniques has been shown to be very narrow and their applications limited. Other techniques have been used to extend modulation ranges, but have been shown to have increased switching frequency and switching power loss, and have difficulty meeting harmonic requirements.

BRIEF SUMMARY

Embodiments of the present invention seek to solve or mitigate one or more problems of the prior art. Embodiments of the present invention include a four quadrant modulation technique that can synthesize a full range solution or a full modulation index range.

A four-quadrant modulation method according to an embodiment of the present invention can include determining switching angles $\theta_r$ and $\theta_f$ without any limitations, wherein $\theta_r$ is a rising switching angle and $\theta_f$ is a falling switching angle; detecting switching angles $\theta_r$ and $\theta_f$ with undesired states and transforming them into practical states and leaving remaining switching angles $\theta_r$ and $\theta_f$ unchanged; and inputting the switching angles $\theta_r$ and $\theta_f$ and the phase information into a logic circuit to generate driving signals.

Embodiments of the present invention can be applied to a DC/AC inverter, an AC to DC rectifier, AC/DC/AC topology, voltage source inverters, current source inverters, rectifiers, STATCOM, and APF. Embodiments of the present invention can be applied to any topology with multilevel voltage or current output without voltage limitations. Embodiments of the present invention can be applied to a neutral point clamped (NPC) topology, flying capacitor (FLC) topology, cascaded H-bridge (CHB) topology, modular multilevel topology, modular multilevel converters, and multimodule converters. Embodiments of the present invention can be applied to multilevel selective harmonic elimination (SHE), multilevel selective harmonic elimination and compensation (SHC), selective harmonic mitigation (SHM), and selective harmonic optimization (SHO). Determining the phase of the grid can be accomplished using a phase locked loop. The switching angles $\theta_r$ and $\theta_f$ with undesired states can be transformed to practical states by assigning new switching angles $\theta_r'$ and $\theta_f'$, wherein $\theta_r'=-\pi+\theta_f$ and $\theta_f'=\pi+\theta_r'$. In addition, the switching angles $\theta_r$ and $\theta_f$ with undesired states can be transformed to practical states by assigning new switching angles $\theta_r'$ and $\theta_f'$, wherein $\theta_r'=\pi+\theta_f$ and $\theta_f'=-\pi+\theta_r'$.

BRIEF DESCRIPTION OF THE DRAWINGS

FIG. 17 is a graph showing derived constraints and CHB harmonic envelope of test 1.

FIG. 18 is a graph showing derived constraints and CHB harmonic envelope of test 2.

FIG. 19(a) is a graph showing a nonlinear load harmonic current envelope and harmonic standard of the inductor design procedure in test 3.

FIG. 19(b) is a graph showing derived constraints and CHB harmonic envelope standard of the inductor design procedure in test 3.

FIG. 20 (a) is a graph showing a nonlinear load harmonic current envelope and harmonic standard of the inductor design procedure in test 4.

FIG. 20(b) is a graph showing derived constraints and CHB harmonic envelope standard of the inductor design procedure in test 4.

DETAILED DESCRIPTION

Embodiments of the present invention include a four quadrant modulation technique that can synthesize a full range solution or a full modulation index range. In an embodiment, a four-quadrant modulation method can include determining the phase of a grid; determining switching angles $\theta_r$ and $\theta_f$ without any limitations, wherein $\theta_r$ is a rising switching angle and $\theta_f$ is a falling switching angle; detecting switching angles $\theta_r$ and $\theta_f$ with undesired states and transforming them into practical states and leaving remaining switching angles $\theta_r$ and $\theta_f$ unchanged; and inputting the switching angles $\theta_r$ and $\theta_f$ and the phase information into a logic circuit to generate driving signals.

Figure 1:
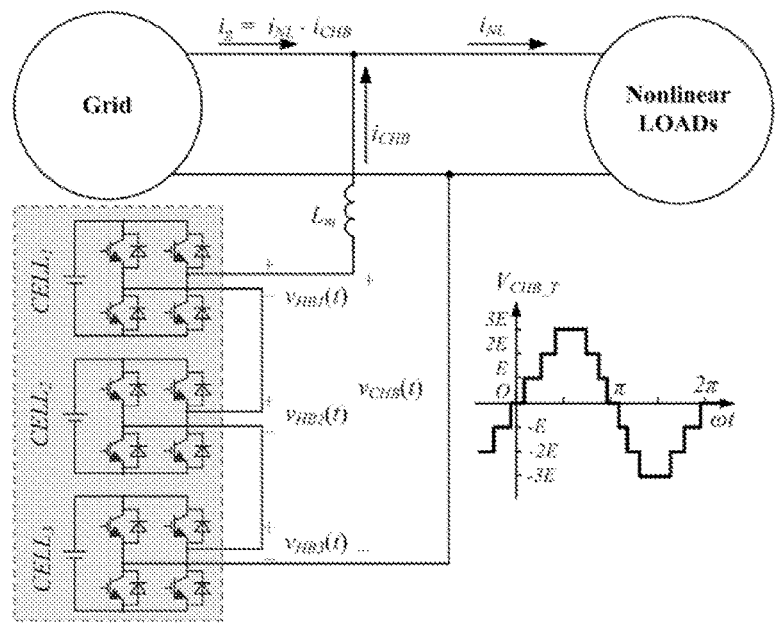
FIG. 1 shows the typical topology and waveforms of a 3-cell CHB system.

FIG. 1 shows the typical topology and waveforms of a 3-cell CHB system. Referring to FIG. 1, a 3-cell cascaded H-bridge (CHB) is tied to a grid, which has nonlinear loads. The load current is $i_{NL}$; the grid current is $i_g$ and the current injected to the grid from the CHB is $i_{CHB}$. The output voltage of the CHB is $v_{CHB}$. The coupling inductor between the CHB and the grid has an inductance of $L_m$. It is well known that, with different modulation techniques, the inductor design is also different. This application will discuss inductor design between sinusoidal pulse width modulation (SPWM) and SHE/SHC. Based on SHE/SHC applications, the effects of inductance on both compensation capacity and the attenuation of undesired harmonics will be analyzed. Guidelines for the inductor design in multilevel SHE/SHC applications will be proposed to ensure that there is compliance with harmonic standards.

In FIG. 1, half-wave symmetry modulation is used to compensate the odd harmonics in a CHB topology.

For one HB, the output voltage $v_{HB}(t)$ can be expressed as, $$v_{HB}(t) = \begin{cases} E, & 2n\pi + \theta_r < \omega_g t < 2n\pi + \theta_f \\ -E, & (2n+1)\pi + \theta_r < \omega_g t < (2n+1) + \theta_f \\ 0, & \text{otherwise} \end{cases} \quad (1)$$

Where, E is the DC bus voltage of a HB; $\omega_g$ is the fundamental angular frequency, which is $2\pi(60)$ rad/s; $\theta_r$ and $\theta_f$ are the switching angles at rising and falling transitions of a HB.

The Fourier series for $v_{HB}(t)$ can be expressed as:

$$v_{HB}(t) = \sum_{h=1}^{\infty} (a_{HB\_h}\cos(h\omega t) + b_{HB\_h}\sin(h\omega t)) \quad (2)$$

$$\begin{cases} a_{HB\_b} = -\frac{2E}{\pi h}(\sin(h\theta_r) - \sin(h\theta_f)) \\ a_{HB\_b} = \frac{2E}{\pi h}(\cos(h\theta_r) - \cos(h\theta_f)) \end{cases} \quad (3)$$

where h is the harmonic order, and h=1, 3, 5, ...

The complex HB output voltage $V_{HB\_h}$ of the h order harmonic is defined as: $V_{HB\_h} = a_{HB\_h} + jb_{HB\_h}$, then the magnitude of each order harmonic is $|V_{HB\_h}|$ and the initial phase is $\angle V_{HB\_h}$.

The expression of $V_{HB\_h}$ can be rewritten as:

$$V_{HB\_h} = \frac{2E}{\pi h}((-\sin(h\theta_r) + j\cos(h\theta_r)) - (-\sin(h\theta_f) + j\cos(h\theta_f))) \quad (4)$$

Based on Euler equation, $-\sin(h\theta)+j\cos(h\theta)=e^{j(h\theta+\pi/2)}$, (4) can be rewritten as:

$$V_{HB\_h} = \frac{2E}{\pi h}\left(e^{j(h\theta_r + \frac{\pi}{2})} - e^{j(h\theta_f + \frac{\pi}{2})}\right) \quad (5)$$

If the base voltage for the $h^{th}$ order harmonic is E/h, (5) can be rewritten in per unit:

$$V_{HB\_h}^p = \frac{2}{\pi}\left(e^{j(h\theta_r + \frac{\pi}{2})} - e^{j(h\theta_f + \frac{\pi}{2})}\right) \quad (6)$$

The voltage phasor diagrams can be developed based on (6). The voltage phasor, $V^p_{HB\_h}$, is determined by two vectors, $\frac{2}{\pi} e^{j(h\theta_r + \frac{\pi}{2})}$ and $\frac{2}{\pi} e^{j(h\theta_f + \frac{\pi}{2})}$.

Figures 2A, 2B, 2C:
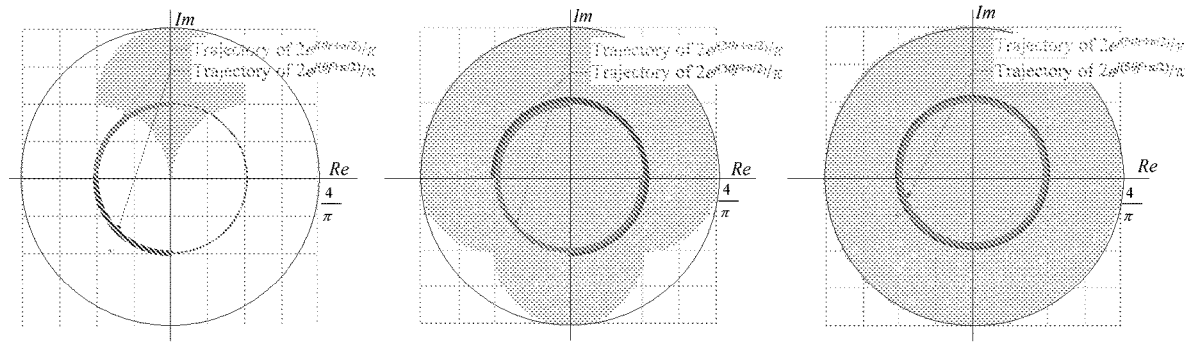
FIG. 2(a) shows the range of fundamental voltage $V^P_{HB\_1}$ in a voltage phasor diagram (per unit) of one HB with $\theta_r \in [0, \pi/2]$ and $\theta_f \in [\pi/2, \pi]$.
FIG. 2(b) shows the range of $3^{rd}$ voltage $V^P_{HB\_3}$ in a voltage phasor diagram (per unit) of one HB with $\theta_r \in [0, \pi/2]$ and $\theta_f \in [\pi/2, \pi]$.
FIG. 2(c) shows the range of $5^{th}$ voltage $V^P_{HB\_5}$ in a voltage phasor diagram (per unit) of one HB with $\theta_r \in [0, \pi/2]$ and $\theta_f \in [\pi/2, \pi]$.

As shown in FIG. 2, if $\theta_r \in [0, \pi/2]$ and $\theta_f \in [\pi/2, \pi]$ [1], [19], the ranges of phasors of $$e^{j(h\theta_r + \frac{\pi}{2})}$$

are shown by the arcs in FIGS. 2 (a), (b), and (c) for h=1, 3, 5. The shaded region represents the range of phasor $V_{HB\_h}$, and it is derived by the ranges of the phasors $$\frac{2}{\pi} e^{j(h\theta_r + \frac{\pi}{2})} \text{ and } \frac{2}{\pi} e^{j(h\theta_f + \frac{\pi}{2})}.$$

Figure 3:
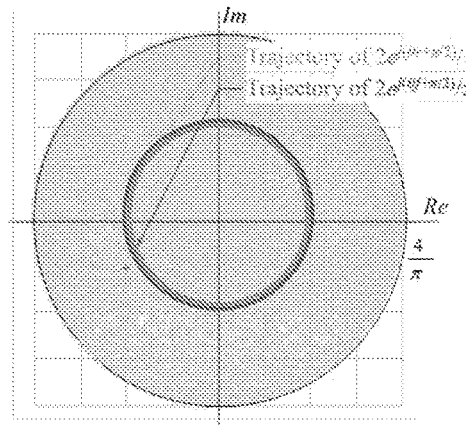
FIG. 3 shows the fundamental voltage phasor diagram (per unit) of one HB with $\theta r \in [-\pi, \pi]$ and $\theta f \in [-\pi, \pi]$.

In FIG. 5(c), for the $5^{th}$ order harmonic, because both the ranges of $5\theta_r$ and $5\theta_f$ exceed 360, the range of $V_{hb\_5}$ covers the whole area inside the range circle with actual radius $4E/5\pi$. Similarly, when h>5, all voltage phasors cover the whole range circles with actual radius $4E/h\pi$ (not shown in FIG. 2). The actual amplitudes of the voltage phasors in FIG. 2 should be multiplied by E/h. As shown in FIG. 2 (a), because switching angles $\theta_r$ and $\theta_f$ have the limited ranges [0, $\pi/2$] and [$\pi/2$, $\pi$], the range of the synthesized fundamental voltage phasor $V_{HB\_1}$ is limited, so it cannot cover the full modulation index range. The same rule can also be applied to the analysis of the synthesized $3^{rd}$ order voltage harmonic $V_{HB\_3}$. Extending the range of $\theta_r$ and $\theta_f$ can therefore increase the ranges of the synthesized phasors and the modulation index range. FIG. 3 shows the range of the fundamental voltage phasor with $\theta_r$ and $\theta_f$ extended to [$-\pi$, $\pi$]. Because both the trajectories $$\frac{2}{\pi} e^{j(h\theta_r + \frac{\pi}{2})} \text{ and } \frac{2}{\pi} e^{j(h\theta_f + \frac{\pi}{2})}$$

cover the full angle range, the synthesized voltage phasor $V_{HB\_1}$ covers the whole range circle with actual radius $4E/\pi$. Because all voltage harmonic phasors fully cover the range circles, they are not shown.

FIG. 2 (c) and FIG. 3 shows that if there is no limitation on range of $\theta_r$ and $\theta_f$, then two phasors $$\frac{2}{\pi} e^{j(h\theta_r + \frac{\pi}{2})} \text{ and } \frac{2}{\pi} e^{j(h\theta_f + \frac{\pi}{2})}$$

can synthesize any phasor within the circle with a radius of $4/\pi$. This conclusion can be proved by algebraic method. Define $V_{REF\_h}$ as $$V_{REF\_h} = \frac{4}{\pi} R_{REF} e^{j\theta_{REQ}},$$

where $R_{REF} \leq 1$ is a non-negative real number related to the magnitude of $V_{REF\_h}$, $\theta_{REF} \in [0, 2\pi]$ is the phase of $V_{REF\_h}$ and $V_{REF\_h}$ can represent any phasor inside the circuit with a radius of $4/\pi$. If the value of $h\theta_r$ and $h\theta_f$ is as below:

$$\begin{cases} \theta_M = \arccos(R_{REF}) \\ h\theta_r = (\theta_{REF} - \theta_M) - \frac{\pi}{2} \\ h\theta_f = (-\pi + \theta_{REF} + \theta_M) - \frac{\pi}{2} \end{cases}$$

Then the synthesized phasor $$\left( \frac{2}{\pi} e^{j(h\theta_r + \frac{\pi}{2})} - \frac{2}{\pi} e^{j(h\theta_f + \frac{\pi}{2})} \right)$$

equals to $V_{REF\_h}$ as proved below:

$$\frac{2}{N\pi} e^{j(h\theta_r + \frac{\pi}{2})} - \frac{2}{N\pi} e^{j(h\theta_f + \frac{\pi}{2})} = \frac{2}{N\pi} (e^{j(\theta_{REQ} - \theta_M)} - e^{j(-\pi + \theta_{REQ} + \theta_M)})$$

$$= \frac{2}{N\pi} (e^{j(\theta_{REQ} - \theta_M)} - e^{-j\pi} e^{j(\theta_{REQ} + \theta_M)})$$

$$= \frac{2}{N\pi} (e^{j(\theta_{REQ} - \theta_M)} + e^{j(\theta_{REQ} + \theta_M)})$$

$$= \frac{2}{N\pi} \begin{pmatrix} \cos(\theta_{REF} - \theta_M) + j\sin(\theta_{REF} - \theta_M) + \\ \cos(\theta_{REF} + \theta_M) + j\sin(\theta_{REF} + \theta_M) \end{pmatrix}$$

$$= \frac{2}{N\pi} \begin{pmatrix} 2\cos(\theta_{REF})\cos(\theta_M) + \\ j2\sin(\theta_{REF})\cos(\theta_M) \end{pmatrix}$$

$$= \frac{4}{N\pi} \cos(\theta_M)(\cos(\theta_{REF}) + j\sin(\theta_{REF}))$$

After $\theta_r$ and $\theta_f$ are extended to [$-\pi$, $\pi$], compared with conventional single quadrant switching angles within [0, $\pi/2$] and [$\pi/2$, $\pi$], the switching angles are four quadrants. The four quadrants switching angles can synthesize a full modulation index while the single quadrant switching angles cannot.

Figure 4:
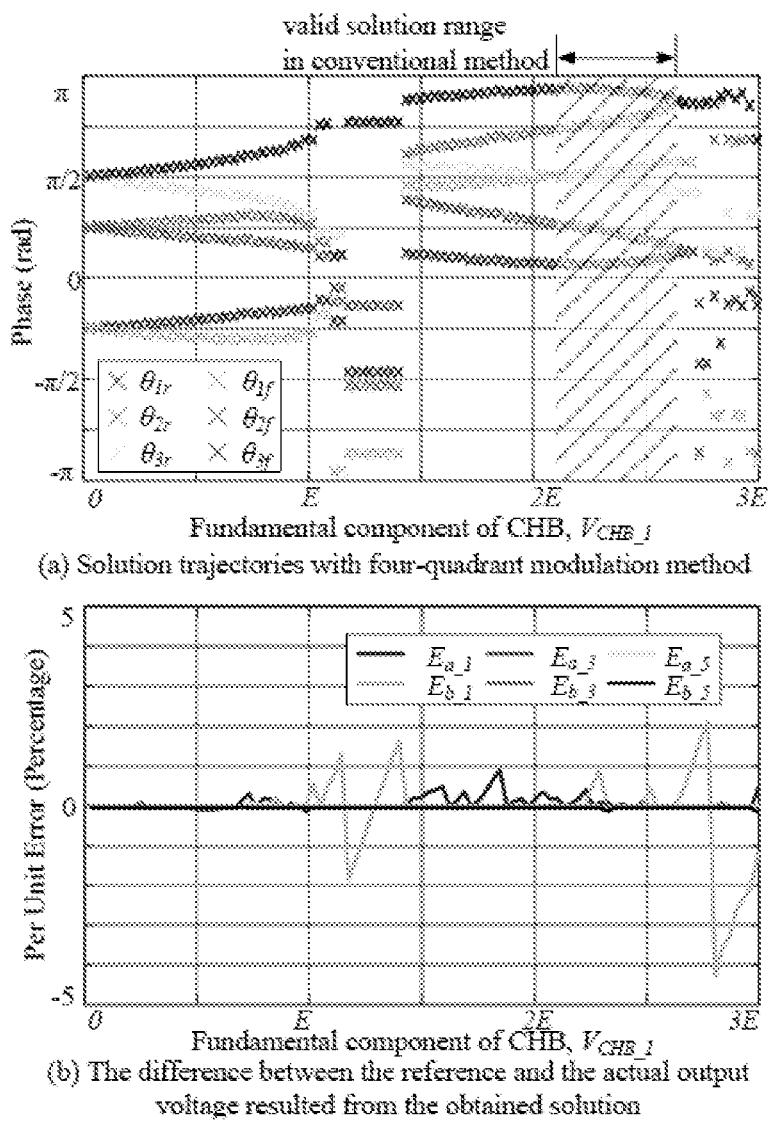
FIG. 4(a) shows solution trajectories of a 7-level cascaded inverter with a four-quadrant modulation method according to an embodiment of the present invention.
FIG. 4(b) shows the difference between the reference and the actual output voltage resulting from solution obtained by a four-quadrant modulation method according to an embodiment of the present invention

To verify the four quadrants switching angle modulation technique according to an embodiment of the present invention, the modulation technique is applied to the 3-cell, 7-level cascaded multilevel inverter of FIG. 1 with selective harmonic elimination (SHE). The references of the 3rd and 5th harmonics are set to zero, and the reference of the fundamental voltage changes from 0 to 3E with phase equal to zero degree. Optimized toolbox with generic algorithm (GA) in MATLAB is used to find the switching angle solutions. The objective function (OF) is set as OF=$|E_1|$+$|E_3|$+$|E_5|$, where $E_h$ is the difference between the voltage reference and the actual CHB voltage resulting from the obtained solutions. For the fundamental voltage, the per unit differences of the real and imaginary parts of the fundamental voltage are defined as $E_{a\_1}$=Re($V_{CHB\_1}$-$V_{Ref\_1}$)/(NE), and $E_{b\_1}$=IM($V_{CHB\_1}$-$V_{Ref\_1}$)/(NE), where $V_{CHB\_1}$ is the actual fundamental output voltage of the CHB, $V_{Ref\_1}$ is the fundamental reference voltage and N=3 is the number of cells. Because the harmonic voltage reference is zero, the per unit differences of harmonic voltages are defined as $E_{a\-h}$=RE($V_{CHB\_h}$)(NE/h), and $E_{b\_h}$=Im($V_{CHB\_h}$)(NE/h), where $V_{CHB\_h}$ is the actual harmonic output voltage of the CHB. From the FIG. 4(a), a four-quadrant modulation according to the present invention can find the solutions within the whole voltage range [0, 3E] and the per-unit error is less than 5%. On the other hand, with conventional single quadrant switching angle modulation technique, the modulation is only valid for [2.10E, 2.67E] (the shaded area). For this 3-cell, 7-level cascaded multilevel inverter, the four-quadrant switching angle modulation technique according to an embodiment of the present invention can therefore expand the modulation index range by more than five times compared with conventional techniques.

Figure 5:
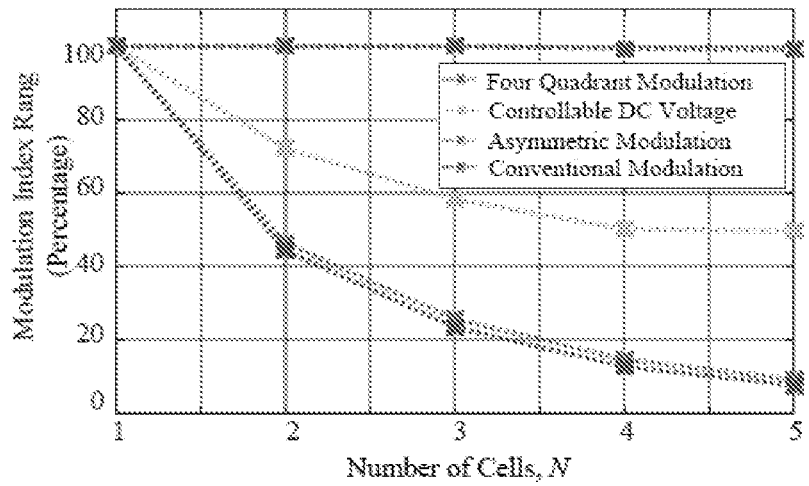
FIG. 5 is a graph of modulation index range versus number of cells with different modulation techniques.

A comparison between the four quadrants switching angle modulation according to the present invention and other conventional modulation techniques is shown in FIG. 5. FIG. 5 shows the relationship of the modulation index range in percentages, which is defined as (Actual Modulation index range)/(Full Modulation index range), versus the number of HB cells of the CHB with different modulation techniques. Here, the Full Modulation index range is from 0 to NE. In FIG. 5, all the modulation techniques aim to eliminate the low order harmonics and control the amplitude of the fundamental component. For the variable DC modulation technique, DC-link voltage of each HB can vary from 0.5E to E. FIG. 5 shows that four-quadrant switching angle modulation techniques according to the present invention can always achieve a full modulation index range; while for other modulation techniques, increasing the number of HB cells reduces the modulation index range.

Figure 6:
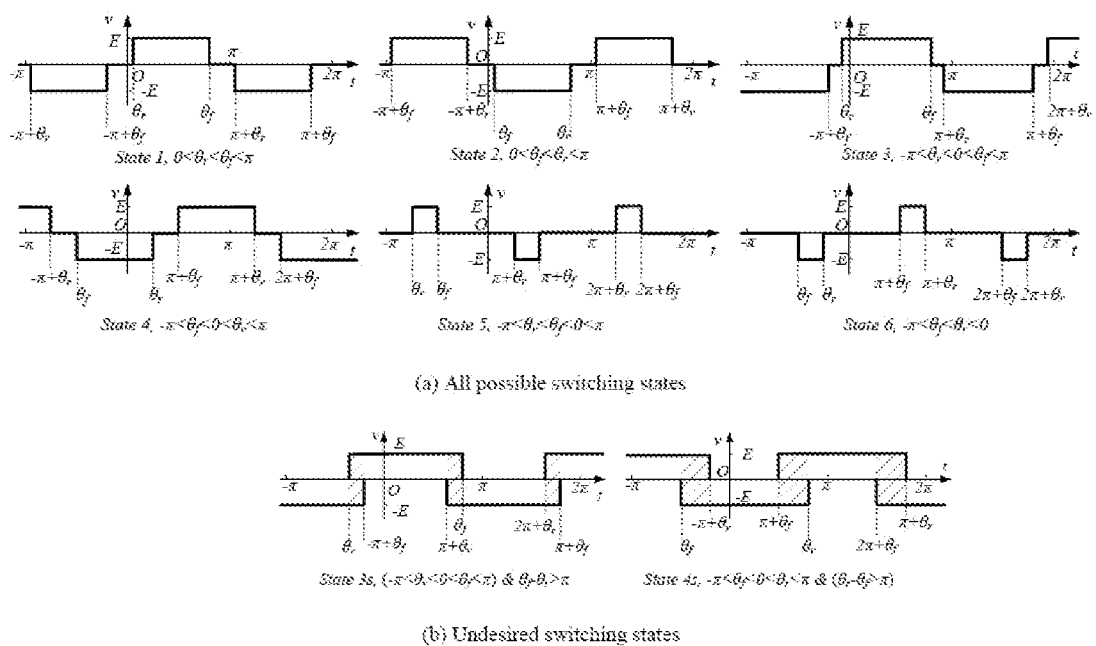
FIG. 6(a) shows all possible switching states of a four-quadrant modulation method according to an embodiment of the present invention.
FIG. 6(b) shows undesired switching states of a four-quadrant modulation method according to an embodiment of the present invention

In a HB, depending on the relationship of $\theta_r$, $\theta_f$ and the 0°, the number of the switching states is equal to $P_3^3=6$. All possible switching states are shown in FIG. 6 (a). In the implementation, a microcontroller (MCU) is used to differentiate each switching state and generate the correspondent driving signals.

$|\theta_r-\theta_f|>\pi$ is not realizable with a HB, but theoretically it could happen with four-quadrant switching angle modulation techniques according to the present invention as shown by state 3s and state 4s in FIG. 6 (b).

Since they cannot be realized using a HB, they are undesired states. To avoid these undesired switching states, $|\theta_r-\theta_f|<\pi$ can be used as a constraint in switching angle calculations, but this would complicate the calculations.

This problem can be avoided by reassigning new switching angles $\theta_r'$ and $\theta_f'$ as in (7) for state 3s and (8) for state 4s.

$$\begin{cases} \theta_r' = -\pi + \theta_f \\ \theta_f' = \pi + \theta_r \end{cases} \quad (7)$$

$$\begin{cases} \theta_r' = \pi + \theta_f \\ \theta_f' = -\pi + \theta_r \end{cases} \quad (8)$$

In (7) for state 3s, the ranges of new switching angles are: $\theta_r' \in [-\pi, 0]$ and $\theta_f' \in [0, \pi]$. Because $\theta_f'-\theta_r'=(\theta_r-\theta_f)+2\pi\in[0, \pi]$, the new switching state will belong to state 3.

The new synthesized voltage phasor $V_{HB\_h}'$ with the reassigned switching angles is identical to the original $V_{HB\_h}$.

This can be proved in (9) because harmonic order h is odd and $e^{-jh\pi}=e^{jh\pi}=-1$:

$$V_{HB\_h}' = \frac{2E}{\pi h}\left(e^{j(h\theta_r'+\frac{\pi}{2})} - e^{j(h\theta_f'+\frac{\pi}{2})}\right) \quad (9)$$

$$= \frac{2E}{\pi h}\left(e^{j(h(-\pi+\theta_f)+\frac{\pi}{2})} - e^{j(h(\pi+\theta_r)+\frac{\pi}{2})}\right)$$

$$= \frac{2E}{\pi h}\left(e^{-jh\pi}e^{j(h\theta_f+\frac{\pi}{2})} - e^{jh\pi}e^{j(h\theta_r+\frac{\pi}{2})}\right)$$

$$= \frac{2E}{\pi h}\left(e^{j(h\theta_r+\frac{\pi}{2})} - e^{j(h\theta_d+\frac{\pi}{2})}\right) = V_{HB}(h)$$

A similar analysis can be applied to state 4s. The ranges of new switching angles are $\theta_r' \in [0, \pi]$ and $\theta_f' \in [-\pi, 0]$. Because $(\theta_r-\theta_f)=(\theta_f-\theta_r)+2\pi\in[0, \pi]$, the new switching state will belong to state 4.

The new synthesized phasor $V_{HB\_h}'$ is identical to the original $V_{HB\_h}$, as proved in (10):

$$V_{HB\_h}' = \frac{2E}{\pi h}\left(e^{j(h\theta_r'+\frac{\pi}{2})} - e^{j(h\theta_d'+\frac{\pi}{2})}\right) = \frac{2E}{\pi h}\left(e^{j(h\theta_r+\frac{\pi}{2})} - e^{j(h\theta_d+\frac{\pi}{2})}\right) = V_{HB\_h} \quad (10)$$

Figure 7:
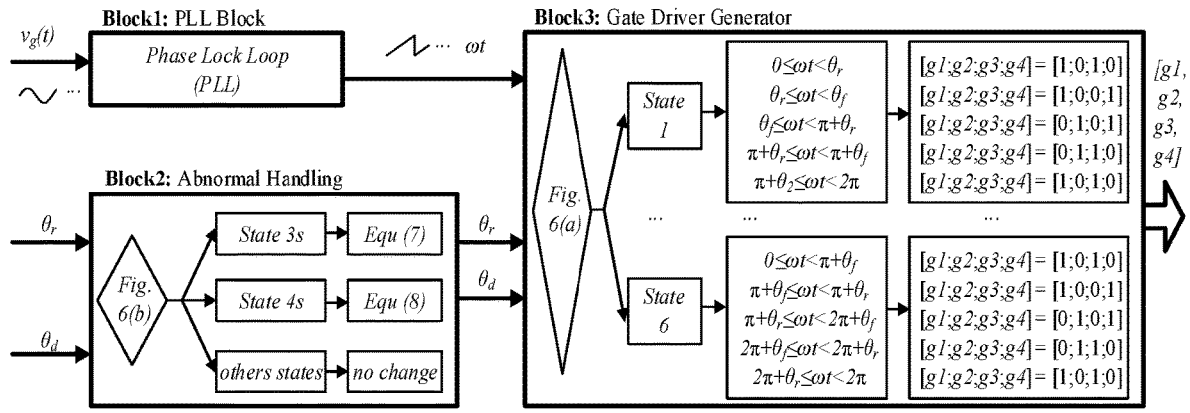
FIG. 7 shows the digital implementation of a four-quadrant switching angle modulation technique for each half-bridge according to an embodiment of the present invention.

The implementation of a four-quadrant switching angle modulation technique according to an embodiment of the present invention is shown in FIG. 7 for each HB. There are three inputs: grid voltage $v_g(t)$, $\theta_r$, and $\theta_f$, and the four driving signals: g1, g2, g3 and g4. Block 1 is the PLL block that obtains the phase information of $v_g(t)$; Block 2 detects state 3s and state 4s and converts them to state 3 and state 4 using (7) and (8), respectively; and Block 3 uses the phase information and switching angles to generate driving signals.

It should be noted that, in FIG. 6 (a), different switching states may generate identical waveforms. For example, state 1 and state 6, or state 2 and state 5 can generate identical waveforms. This indicates that duplicated solutions can exist in four-quadrant switching angle modulation techniques according to the present invention. Because this does not have any negative impacts to the implementation or calculations, it will not be discussed in detail.

Four-quadrant switching angle modulation techniques of the present invention can be applied to different grid applications such as harmonic elimination, harmonic mitigation and harmonic compensation, etc.

In FIG. 1, inductor $L_m$'s design is critical because it has significant impact on power density, compensation capacity and current quality of the system. With the SPWM technique, high inductances can reduce undesired switching harmonics from being injected into the power grid, but high inductances also decrease compensation current capacity.

Therefore, the upper and lower bounds of the inductance are calculated based on compensation capacity and attenuation requirements for switching harmonics, respectively. In multilevel SHE/SHC, the inductor design process is similar, but the values of the bounds are different from the SPWM technique.

In the following paragraphs, inductor design constraints based on fundamental component compensation will be discussed. Next, the relationship between inductance $L_m$ and the injected CHB current harmonic spectrum envelope is analyzed. Third, based on the injected CHB current harmonic spectrum envelope, inductor design constraints for both controllable harmonics (which are related to compensation capacity) and uncontrollable harmonics (which are related to the attenuation of undesired harmonics) are discussed, respectively. Finally, an inductor design procedure is proposed based on all of these constraints.

This application will only discuss grid-tied SHC. The generalized solution can be applied to all grid-tied applications, such as SHE and all offline applications.

The output voltage of the CHB is the sum of all FIB voltages, so the time domain waveform and frequency domain spectrum can be expressed as, $$v_{CHB}(t) = \sum_{i=1}^{N}(v_{HB\_i}(t)) \quad (11)$$

$$V_{CHB\_h} = \sum_{i=1}^{N}(V_{HB\_i\_h}) = \frac{2NE}{\pi h}\sum_{i=1}^{N}\left(e^{j(h\theta_{if}+\frac{\pi}{2})} - e^{j(h\theta_{ir}+\frac{\pi}{2})}\right), \quad (12)$$

$$h = 1, 3, \ldots$$

where h is the order of the specific HB, i is the sequence number of HBs, and $\theta_{i_r}$ and $\theta_{i_f}$ are the switching angles at rising and falling transitions of the $i^{th}$ HB;

With a four-quadrant switching angle modulation technique according to the present invention, the generated $V_{CHB\_h}$ can cover the full range circle with a radius equal to $4NE/\pi h$:

$$|V_{CHB\_h}| \leq 4NE/(\pi h) \tag{13}$$

The output current of the CUB is:

$$I_{CHB\_h} = \begin{cases} \dfrac{V_{CHB\_h} - V_g}{j\omega_g L}, & h = 1 \tag{14} \\ \dfrac{V_{CHB\_h}}{jh\omega_g L}, & h = 3, 5, \ldots \tag{15} \end{cases}$$

From (14) and (15), the spectrum envelope $|I_{CHB\_h}|_{ENV}$ for harmonics (h>1) is:

$$|I_{CHB\_h}|_{ENV} = \frac{|V_{CHB\_h}|_{max}}{h\omega_g L} = \frac{4NE}{h^2 \pi \omega_g L}, h = 3, 5, \ldots \tag{16}$$

where $|V_{CHB\_h}|$ max is the maximum magnitude of all possible $h^{th}$ order harmonics.

For fundamental compensation, the following condition should be met:

$$V_{CHB\_1} = j\omega_g L * I_{REF\_1} + V_g \tag{17}$$

where $I_{REF\_1}$ is the reference fundamental current for the CHB. $I_{REF\_1}$ can be either active (for generator or battery charging function), reactive (for STATCOM function), or zero (for harmonic compensation function). From (13) and (17), for the fundamental component, the following constraint for $I_{REF\_1}$ should be met:
If $V_{CHB\_1}|$ max can meet the in-equality defined by above, then the in-equality can always be satisfied with any $I_{REF\_1}$. To reach maximum $|V_{CHB\_1}|$, the fundamental reference current is $I_{REF\_1} = |I_{REF\_1}|_{max} \angle (\arg(V_g) - 90°)$, then
$|V_{CHB\_1}| = |V_{CHB\_1}|_{max} = \omega_g L |I_{REF\_1}|_{max} + |V_g| \leq 4NE/\pi.$ then the constraint for L is:

$|V_{CHB\_1}| = |j\omega_g L * I_{REF\_1} + V_g| \leq 4NE/\pi$ $$\begin{cases} L_{fun} = \dfrac{4NE/\pi - |V_g|}{\omega_g |I_{REF\_1}|_{max}} \\ L \leq L_{fun} \end{cases} \tag{18}$$

For convenience, harmonics of a multilevel SHC are divided into controllable harmonics and uncontrollable harmonics. If the magnitude and phase of a harmonic can be controlled with a four-quadrant switching angle modulation technique according to the present invention, it is a controllable harmonic. Otherwise, it is an uncontrollable harmonic. Embodiments of the present invention can control the low order harmonics. If H is the highest order of all controllable harmonics, for h<H, $I_{CHB\_h}$ can be controlled.

As shown in FIG. 1, if $I_{NL\_h}$ is the harmonic current generated from non-linear load on the grid, for both the controllable and uncontrollable harmonics, the grid current $I_{g\_h}$ after compensation is given by (19), and its magnitude should meet harmonic standards $I_{STD\_h}$ in (20):

$$I_{g\_h} = I_{NL\_h} - I_{CHB\_h}, h = 1, 3, 5, \ldots \tag{19}$$

$$|I_{g\_h}| < |I_{STD\_h}|, h = 3, 5, \ldots \tag{20}$$

For the controllable harmonics, to ensure that the grid current harmonics are as small as possible, the current references can be designed according (21).

$$\begin{cases} I_{REF\_h} = I_{NL\_h}, & \text{if } |I_{CHB\_h}|_{ENV} \geq I_{NL\_h} \\ I_{REF\_h} = |I_{CHB\_h}|_{ENV} \angle I_{NL\_h}, & \text{if } |I_{CHB\_h}|_{ENV} < I_{NL\_h} \end{cases} \tag{21}$$

In (21), if $I_{CHB\_h}$ is higher than $I_{NL\_h}$, the current reference for the $h^{th}$ order harmonic will be equal to $I_{NL\_h}$; then a full compensation is achieved. If $I_{CHB\_h}$ cannot be higher than $I_{NL\_h}$, the current reference would have the maximum magnitude (the envelop magnitude) and the same phase as $I_{NL\_h}$. Then $|I_{g\_h}| = |I_{NL\_h} - I_{CHB\_h}| = |I_{NL\_h}| - |I_{CHB\_h}|_{ENV}$. The $L_m$ design should guarantee $|I_{NL\_h}| - |I_{CHB\_h}|ENV \leq I_{STD\_h}$ or $|I_{CHB\_h|ENV} \geq |I_{NL\_h}| - |I_{STD\_h}|$.

Therefore, the constraint for harmonic compensation capacity is:

$$\begin{cases} I_{cap\_h} = |I_{NL\_h}| - |I_{STD\_h}| \\ |I_{CHB\_h}|_{ENV} \geq I_{cap\_h} \end{cases} \tag{22}$$

For undesired uncontrollable harmonics above order H, the worst case should be considered.

From (19) and (20), the constraint can be described as, $|I_{g\_h}|_{max} = |I_{NL\_h} - I_{CHB\_h}|_{max} = |I_{NL\_h}|_{max} + |I_{CHB\_h}|_{max} \leq |I_{STD\_h}|$ or, $$\begin{cases} I_{und\_h} = |I_{NL\_h}| - |I_{STD\_h}| \\ |I_{CHB\_h}|_{ENV} \leq I_{und\_h} \end{cases} \tag{23}$$

The constraint above for $|I_{CHB\_h}|_{max}$ holds when $|I_{STD\_h}|$ is larger than $|I_{NL\_h}|$, otherwise, the $|I_{CHB\_h}|_{max}$ should be as small as possible when other constraints are met.

Figure 8:
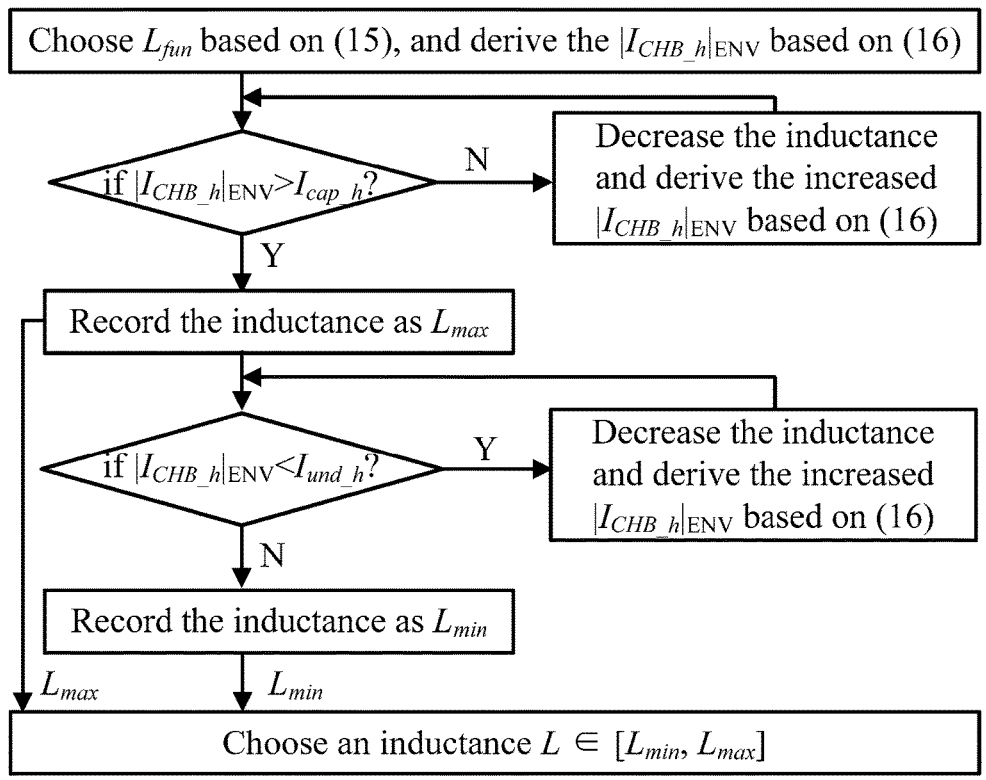
FIG. 8 is a flow chart to determine the inductance range where a grid current after compensation can meet the constraints on fundamental compensation, harmonic compensation and undesired harmonic injection.

Based on the identified constraints above, the recommended inductor design procedure is:
Step 1: Derive the Limitation on $L_{fun}$ based on fundamental requirement (18);
Step 2: Measure/calculate $I_{NL\_h}$ envelope, and harmonic current requirement $I_{STD\_h}$ in the standard;
Step 3: Use (22) to derive the constraints on compensation capacity, $I_{cap\_h}$ and use (23) to derive the constraints on undesired harmonic injection, $I_{und\_h}$;
Step 4: Decrease the inductance from $L_{fun}$, and find the range[$L_{min}$, $L_{max}$] where (15), (22) and (23) can be met at the same time. FIG. 8 shows a flow chart describing the process in detail. Finally an inductance inside the range is chosen.

Figure 9:
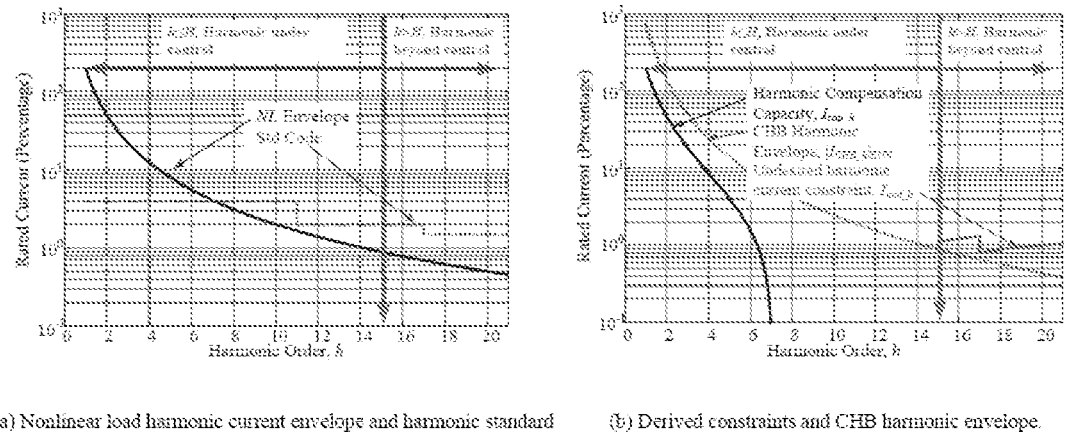
FIG. 9(a) is a graph showing an example of a design procedure for inductance with a nonlinear load harmonic current envelope and harmonic standard.
FIG. 9(b) is a graph showing an example of a design procedure for inductance with derived constraints and a CHB harmonic envelope.

FIG. 9 shows an example of the proposed inductor design procedure. In step 1, the fundamental requirement $L_{fun}$ is calculated; then, in step 2 the current envelope of nonlinear load, $I_{NL\_h}$, is calculated/measured and the harmonic requirement, $I_{STD\_h}$, is obtained from the standard as shown in FIG. 9(a). In step 3, the current constraints on compensation capacity, $I_{cap\_h}$, is derived from (22) and plotted in FIG. 9(b); the current constraints on undesired harmonic, $I_{und\_h}$, is derived from (23) and plotted as well. In step 4, inductance L is determined and $|I_{CHB\_h}|ENV$ is derived based on (16) and plotted. As shown in FIG. 9(b), because the dotted line is between the constraints (i.e. $I_{CHB\_h}|ENV>I_{cap\_h}$ and $|I_{CHB\_h}|ENV<I_{cap\_h}$), the constraints on both the compensation capacity and undesired harmonic can be met.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A four-quadrant modulation method, comprising:
determining the phase of a grid;
determining switching angles $\theta_r$ and $\theta_f$, wherein $\theta_r$ is a rising switching angle and $\theta_f$ is a falling switching angle;
detecting switching angles $\theta_r$ and $\theta_f$ with undesired states and transforming them into practical states and leaving remaining switching angles $\theta_r$ and $\theta_f$ unchanged; and
inputting the switching angles $\theta_r$ and $\theta_f$ and the phase information into a logic circuit to generate driving signals.

Embodiment 2. The four-quadrant modulation method according to embodiment 1, wherein determining switching angles $\theta_r$ and $\theta_f$ comprises determining switching angles $\theta_r$ and $\theta_f$ without any limitations on a range of $\theta_r$.

Embodiment 3. The four-quadrant modulation method according to any of embodiments 1-2, wherein determining switching angles $\theta_r$ and $\theta_f$ comprises determining switching angles $\theta_r$ and $\theta_f$ without any limitations on a range of $\theta_f$.

Embodiment 4. The four-quadrant modulation method according to any of embodiments 1-3, wherein the method is applied to a DC/AC inverter, an AC to DC rectifier, or a device with an AC/DC/AC topology.

Embodiment 5. The four-quadrant modulation method according to any of embodiments 1-4, wherein the method is applied to a neutral point clamped (NPC) topology, a flying capacitor (FLC) topology, a cascaded H-bridge (CHB) topology, a modular multilevel topology, a modular multilevel converters, or a multi-module converter.

Embodiment 6. The four-quadrant modulation method according to any of embodiments 1-5, wherein the method is applied to a multilevel selective harmonic elimination (SHE), a multilevel selective harmonic elimination and compensation (SHC), a selective harmonic mitigation (SHM), or a selective harmonic optimization (SHO).

Embodiment 7. The four-quadrant modulation method according to any of embodiments 1-6, wherein determining the phase of the grid comprising using a phase locked loop to determine the phase of the grid.

Embodiment 8. The four-quadrant modulation method according to any of embodiments 1-7, wherein the switching angles $\theta_r$ and $\theta_f$ with undesired states are transformed to practical states by assigning new switching angles $\theta_r'$ and $\theta_f'$, wherein $\theta_r'=-\pi+\theta_f$ and $\theta_f'=\pi+\theta_r'$.

Embodiment 101. A four-quadrant modulation method, comprising:
providing an inverter;
determining a phase of a grid of the inverter;
determining switching angles $\theta_r$ and $\theta_f$, wherein $\theta_r$ is a rising switching angle and $\theta_f$ is a falling switching angle;
detecting switching angles $\theta_r$ and $\theta_f$ with undesired states and transforming them into practical states and leaving remaining switching angles $\theta_r$ and $\theta_f$ unchanged; and inputting the switching angles $\theta_r$ and $\theta_f$ and the phase information into a logic circuit to generate driving signals.

Embodiment 102. The four-quadrant modulation method according to embodiment 101, wherein the inverter is a multilevel inverter.

Embodiment 103. The four-quadrant modulation method according to any of embodiments 101-102, wherein the inverter is a 3-cell, 7-level cascaded inverter.

Embodiment 104. The four-quadrant modulation method according to any of embodiments 101-103, wherein determining switching angles $\theta_r$ and $\theta_f$ comprises determining switching angles $\theta_r$ and $\theta_f$ without any limitations on a range of $\theta_r$.

Embodiment 105. The four-quadrant modulation method according to any of embodiments 101-104, wherein determining switching angles $\theta_r$ and $\theta_f$ comprises determining switching angles $\theta_r$ and $\theta_f$ without any limitations on a range of $\theta_f$.

Embodiment 106. The four-quadrant modulation method according to according to any of embodiments 101-105, wherein the method is applied to a DC/AC inverter, an AC to DC rectifier, or a device with an AC/DC/AC topology.

Embodiment 107. The four-quadrant modulation method according to according to any of embodiments 101-106, wherein the method is applied to a neutral point clamped (NPC) topology, a flying capacitor (FLC) topology, a cascaded H-bridge (CHB) topology, a modular multilevel topology, a modular multilevel converters, or a multi-module converter.

Embodiment 108. The four-quadrant modulation method according to according to any of embodiments 101-107, wherein the method is applied to a multilevel selective harmonic elimination (SHE), a multilevel selective harmonic elimination and compensation (SHC), a selective harmonic mitigation (SHM), or a selective harmonic optimization (SHO).

Embodiment 109. The four-quadrant modulation method according to according to any of embodiments 101-108, wherein determining the phase of the grid comprising using a phase locked loop to determine the phase of the grid.

Embodiment 110. The four-quadrant modulation method according to according to any of embodiments 101-109, wherein the switching angles $\theta_r$ and $\theta_f$ with undesired states are transformed to practical states by assigning new switching angles $\theta_r'$ and $\theta_f'$, wherein $\theta_r'=-\pi+\theta_f$ and $\theta_f'=\pi n+\theta_r'$.

Figure 21:
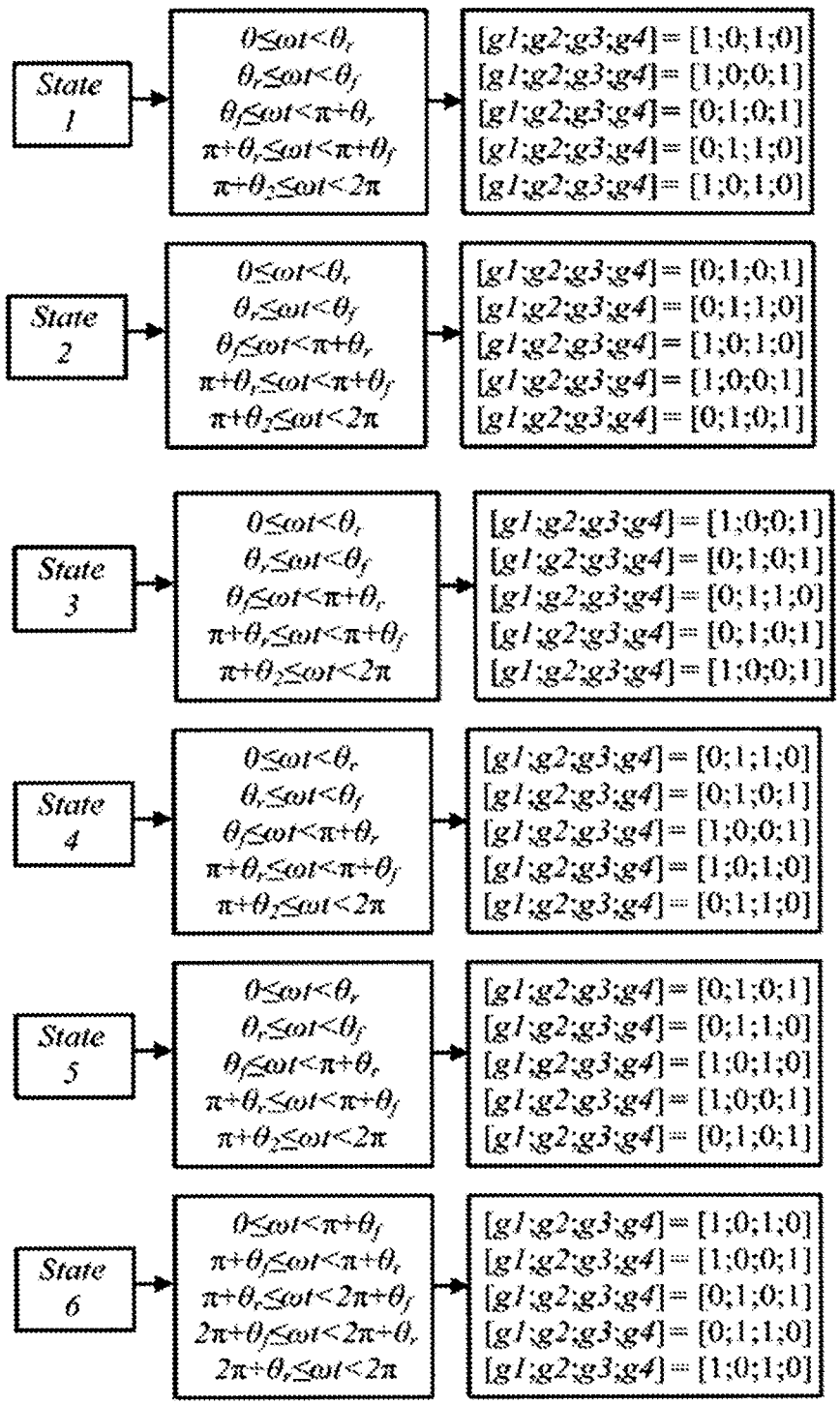
FIG. 21 shows six switching states (state 1 through state 6).

Embodiment 111. The four-quadrant modulation method according to according to any of embodiments 101-110, wherein the inverter comprises six switching states, and wherein state 1 through state 6 are defined in FIG. 21.

Embodiment 201. A system for four-quadrant modulation, the system comprising:
 a processor; and
 a (non-transitory) machine-readable medium (e.g., a (non-transitory) computer-readable medium) in operable communication with the processor and having machine-executable instructions (e.g., computer-executable instructions) stored thereon that, when executed by the processor, perform the method according to any of embodiments 1-8 or 101-111.

Embodiment 202. The system according to embodiment 201, further comprising an inverter.

Embodiment 203. The system according to embodiment 202, wherein the inverter is a multilevel inverter.

Embodiment 204. The system according to any of embodiments 202-203, wherein the inverter is a 3-cell, 7-level cascaded inverter.

Embodiment 205. The system according to any of embodiments 201-204, further comprising a DC/AC inverter.

Embodiment 206. The system according to any of embodiments 201-205, further comprising an AC to DC rectifier Embodiment 207. The system according to any of embodiments 201-206, further comprising a device with an AC/DC/AC topology.

A greater understanding of the present invention and of its many advantages may be had from the following example, given by way of illustration. The following example is illustrative of some of the methods, applications, embodiments and variants of the present invention. It is, of course, not to be considered as limiting the invention. Numerous changes and modifications can be made with respect to the invention.

Example 1

Figure 10:
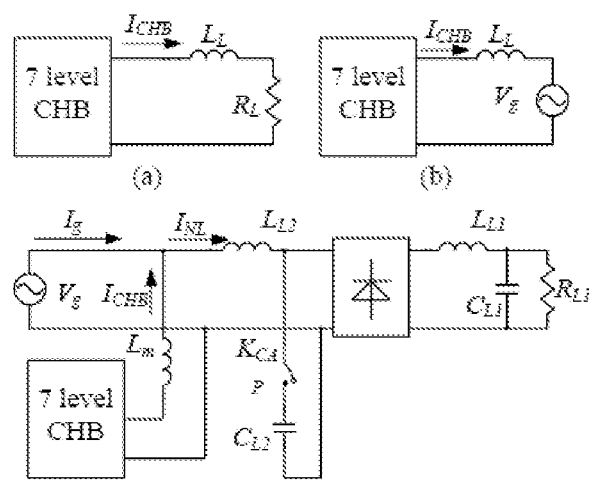
FIG. 10 shows the topology of a simulation experiment according to an embodiment of the present invention.
Figure 11:
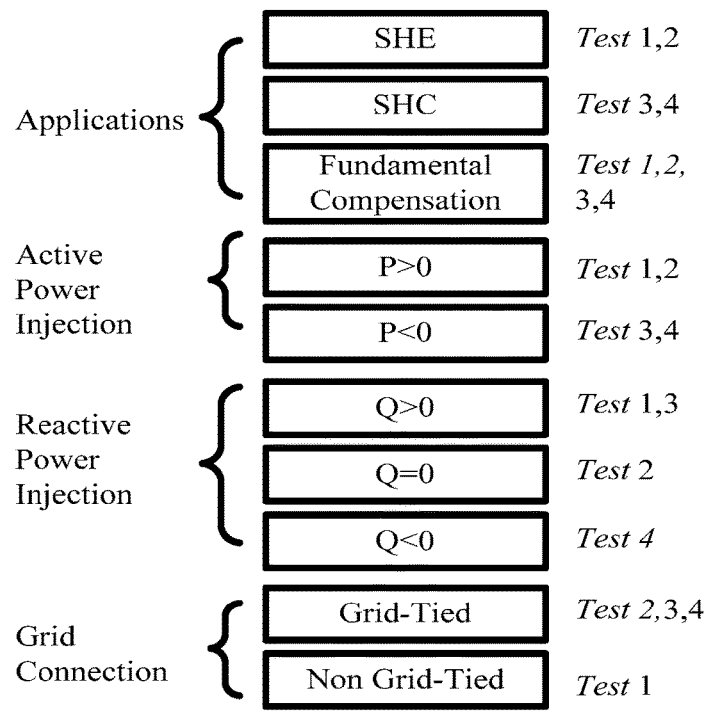
FIG. 11 shows a proof of concept test plan for the present invention.

A simulation and proof of concept experiment was conducted for a 3-cell, 7 level 1 kVA prototype to validate a four-quadrant switching angle modulation technique according to an embodiment of the present invention. The circuit topology, test plan and parameters are shown in FIG. 10, FIG. 11, Table I, and Table II, respectively. Simulations were conducted on MATLAB SIMULINK, and the experimental waveforms were recorded with a RIGOL MSO4054 digital oscilloscope. The spectrums from simulations and experiments were calculated using MATLAB FFT tool. The harmonic mitigation technique was implemented, and up to 15 harmonics could be controlled. Detailed inductor design based on the inductor design procedure is below. Harmonic standard IEEE 519 was used as the harmonic limitation. The calculated four-quadrant switching angles are shown in TABLE III.

Figure 12:
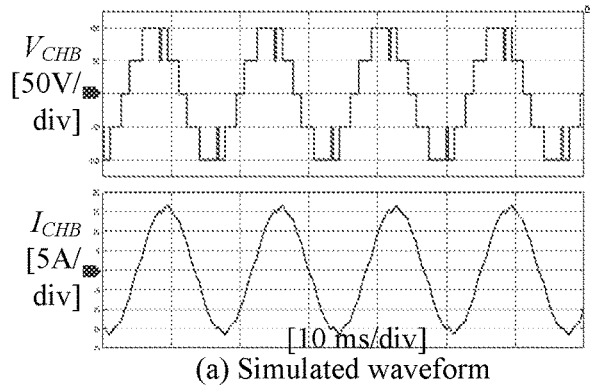
FIGS. 12(a) to 12(d) show experimental and simulation results of a first test after applying a four-quadrant switching angle modulation technique according to the present invention.
Figure 12:
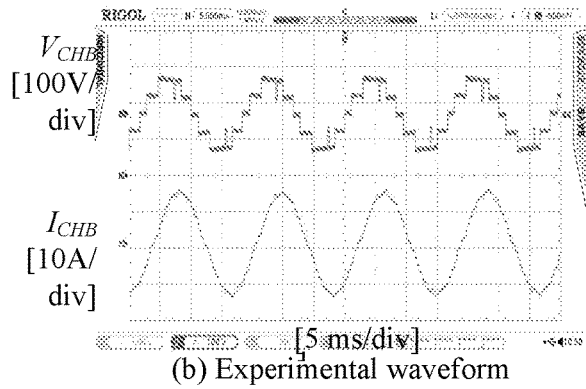
Figure 12:
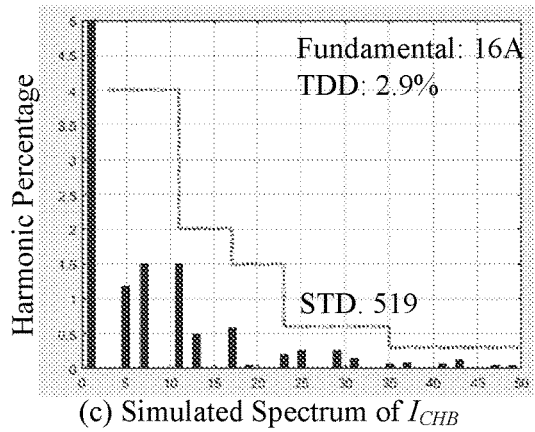
Figure 12:
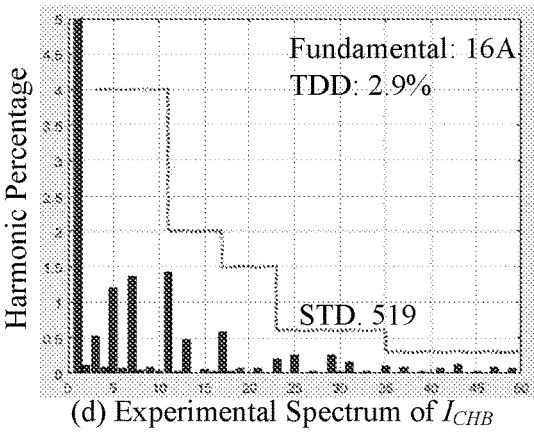

FIG. 12 shows the experimental and simulation results for test 1 after applying a four-quadrant switching angle modulation technique according to an embodiment of the present invention in the non-grid tied system with RL load in FIG. 9(a). With the four-quadrant switching angle modulation technique, the $V_{CHB}$ is five-level, instead of seven-level, while the switching frequency is still 60 Hz in each HB. The current spectrum shows that the fundamental component, harmonics and total demand distortion (TDD) meet the requirements.

TABLE I

CONFIGURATION OF THE SIMULATION AND EXPERIMENT

| | Topology | Fundamental Parameters |
|---|---|---|
| Test 1 | (a) | P = 640 W, Q = 483VAR |
| Test 2 | (b) | P = 990 W, Q = 0 |
| Test 3 | (c), $K_{CAP}$ OFF | P = −480 W, Q = 480 VAR |
| Test 4 | (c), $K_{CAP}$ ON | P = −390 W, Q = −480 VAR |

TABLE II

PARAMETERS OF SIMULAITON & EXPERIMENT

| | |
|---|---|
| Grid Voltage, $V_g$ | 110 V/60 Hz |
| DC bus voltage, E | 50 V |
| Number of cells, N | 3 |
| Inductance $L_L$ | 10 mH |
| Resistance $R_L$ | 5 ohm |
| Inductance $L_{L1}$ | 5 mH |
| Inductance $L_{L2}$ | 2.5 mH |
| Capacitance $C_{L1}$ | 1000 uF |
| Capacitance $C_{L2}$ | 400 uF |
| Inductance $L_m$ | 5 mH |
| Resistance $R_{L1}$ | 7.5 ohm (Test 3) |
| | 15 ohm (Test 4) |

TABLE III

THE CALCULATED FOUR-QURDRANT SWITCHING ANGLES

| | $\theta_r$ (deg) | $\theta_f$ (deg) | switching state |
|---|---|---|---|
| Test 1 | 112.4 | 106.8 | State 2 |
| | 52.35 | 132.3 | State 1 |
| | 12.16 | 166.8 | State 1 |
| Test 1* | 0 | 180 | State 1 |
| | 55.76 | 90.93 | State 1 |
| | 89.90 | 124.2 | State 1 |
| Test 2 | −62.51 | −143.0 | State 6 |
| | −22.96 | 177.5 | State 3s |
| | −42.11 | 78.01 | State 3 |
| Test 3 | 31.10 | 162.8 | State 1 |
| | 53.70 | 146.4 | State 1 |
| | 88.67 | 105.5 | State 1 |
| Test 4 | 80.30 | −174.9 | State 4s |
| | −20.10 | 140.8 | State 3 |
| | 42.31 | 30.25 | State 2 |

Figure 13:
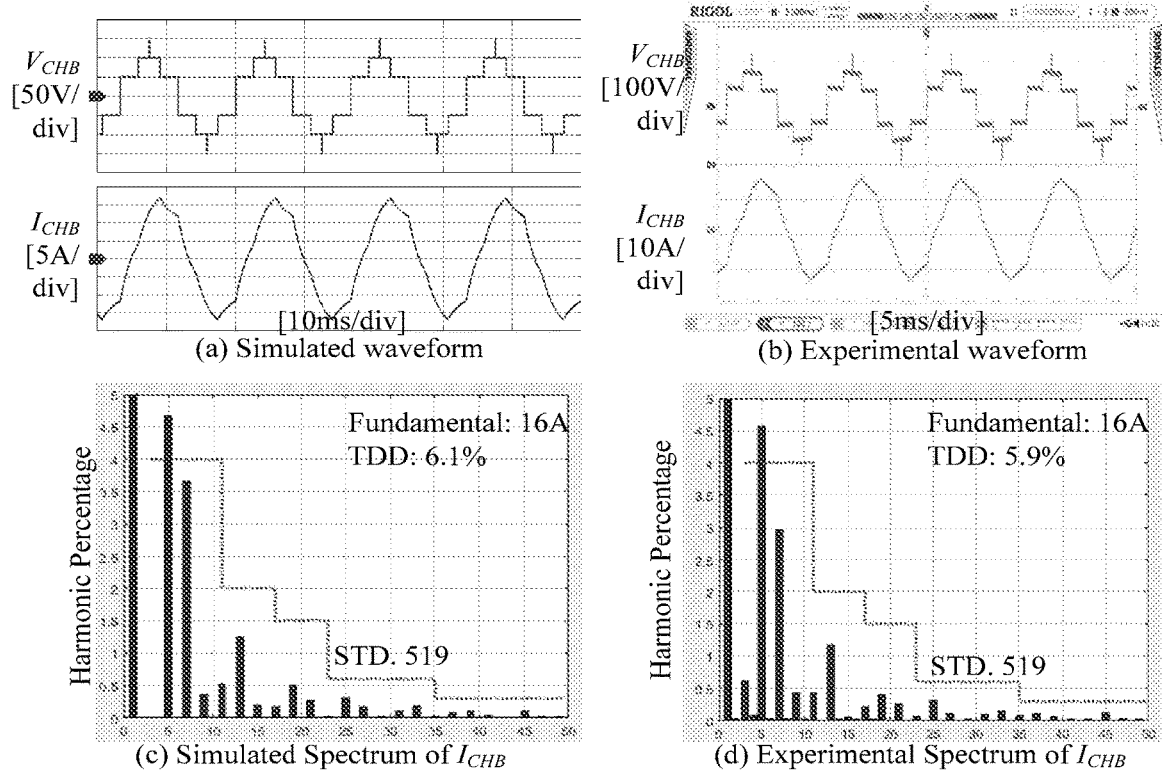
FIGS. 13(a) to 13(d) show experimental and simulation results of a first test after applying a conventional modulation technique.

If a conventional modulation technique is adopted, the switching angle solutions cannot be found. One practical solution is to sacrifice high order harmonics and only control fundamental and $3^{rd}$ harmonics. The waveforms and the current spectrums with a conventional single quadrant switching angle modulation technique are as shown in FIG. 13 for test 1*. In the FIG. 14, the waveform is 7-level, but its current harmonic cannot meet the harmonic requirement. The comparison of FIGS. 12 and 13 shows the advantages of embodiments of the present invention.

Figure 14:
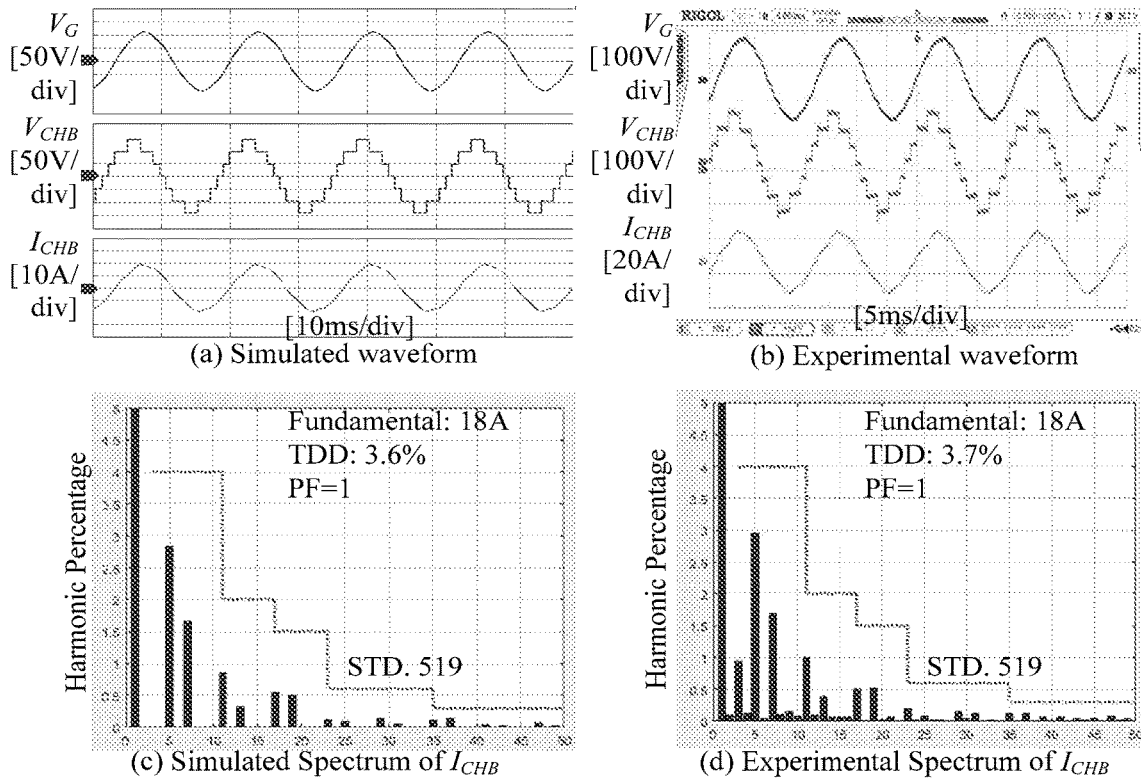
FIGS. 14(a) to 14(d) show experimental and simulation results of a second test after applying a four-quadrant switching angle modulation technique according to the present invention.
Figure 15:
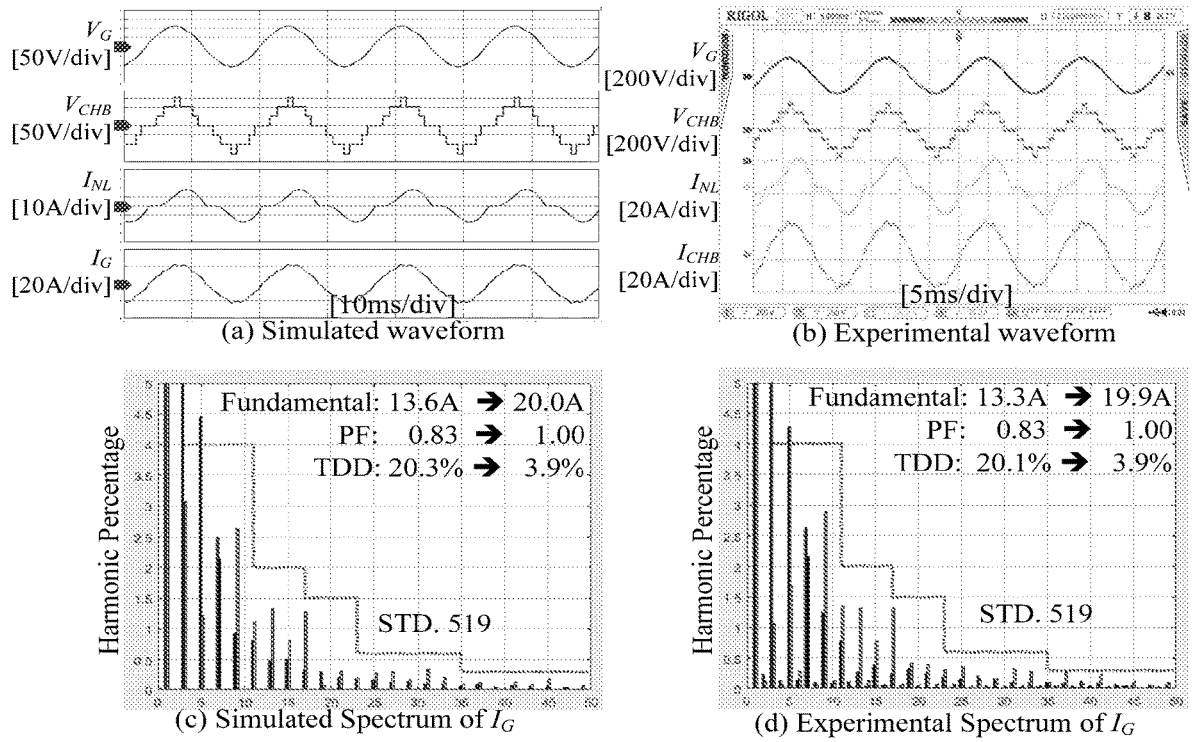
FIGS. 15(a) to 15(d) show experimental and simulation results of a third test after applying a four-quadrant switching angle modulation technique according to the present invention.
Figure 16:
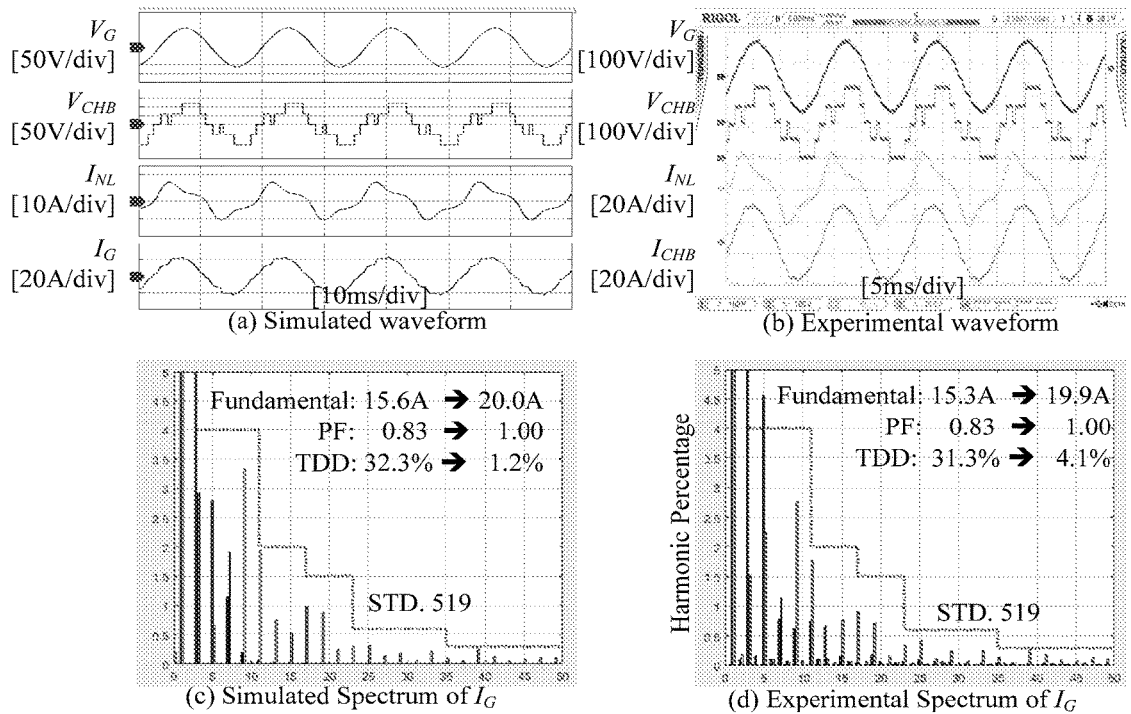
FIGS. 16(a) to 16(d) show experimental and simulation results of a third test after applying a four-quadrant switching angle modulation technique according to the present invention.

FIG. 14 shows the results of test 2 after a four quadrant modulation technique according to the present invention is applied to a grid-tied CHB system. The results of test 3 in FIG. 15 and the results of test 4 in FIG. 16 show that a four quadrant modulation according to the present invention can be used to simultaneously draw active power from the grid to charge batteries, compensate the harmonics of non-linear loads, and compensate the reactive power on the grid. Both the harmonic spectra before compensation and after compensations are shown in both FIGS. 15 and 16. The solid bars are the spectrum before the compensation and the empty bars are the spectrum after the compensation. Both simulation and experimental results show that the active power is well controlled as designed to charge batteries (i.e., PF was controlled to be unity), high order harmonics are below the standard, and TDD is below 5%.

Conventional single-quadrant switching angle modulation techniques cannot find solutions for test 1, 2 and 4, while four quadrant modulation according to the present invention can find solutions for all 4 tests. This proves that four quadrant modulation techniques according to the present invention can significantly extend modulation index ranges.

The detailed process for the inductor design in the above simulation and experiment will now be discussed.

Test 1 is an offline application. Therefore, Vg=0, $Z=j_h\omega_g L+R$. Hence (16) is transformed to $$|I_{CHB\_h}|_{ENV} = \frac{4E}{h|Z|} = \frac{4E}{h\sqrt{(\omega_g L)^2 + R^2}}$$

is transformed to $$Z_{fun} = \frac{4NE}{\pi|I_{REF\_1}|_{max}}$$

and $$L_{fun} = \sqrt{Z_{fun}^2 - R^2}/\omega_g.$$

In step 1, $L_{fun}$ equals to 21.6 mH; in step 2, $I_{NL\_h}=0$ because no compensation is required in the system, and the current harmonic requirement, $I_{STD\_h}$, is regulated by Std. 519 with its strictest limitation; in step 3, from (22), $I_{cap\_h}=-I_{STD\_h}<0$ indicating that no compensation requirement is required and from (23) $I_{und\_h}=I_{STD\_h}$; in step 4, $L_{min}=7.8$ mH and $L_{max}=21.6$ mH. Therefore, a 10 mH inductor is used in the system. The relationship between the constraints and $|I_{CHB\_h}|_{ENV}$ is as shown in FIG. 17.

Test 2 is a grid-tied system with an elimination purpose. Similar to test 1, $I_{NL}=0$ because there is no compensation requirement. The grid voltage is provided by a strong grid with an auto-transformer, STACO 2513-3. In step 1, $L_{fun}=10.74$ mH; in step 2, $I_{NL\_h}=0$ and the current harmonic, $I_{STD\_h}$, is regulated by Std. 519; from (22), $I_{cap\_h}=-I_{STD\_h}<0$ indicating that no compensation requirement is required and from (23) $I_{und\_h}=I_{STD\_h}$; in step 4, $L_{min}=4.6$ mH and $L_{max}=10.74$ mH. A 10 mH inductor is used in the system. The relationship between the constraints and $|I_{CHB\_h}|_{ENV}$ is as shown in FIG. 18.

It should be noted that $I_{STD\_h}$ in Std. 519 is related to $|I_{SC}/I_{rated}|$, where $I_{SC}$ is short current. Because $Z_g$ is ignorable with strong grid, and $Z_T=0.32+j0.078$, which is measured using an impedance analyzer, KEYSIGHT E4990A at 60 Hz, the short current is $I_{SC}=V_g/(Z_g+Z_T)=(459-j112)$ A, and $|I_{SC}/I_{rated}|=23.6$. The $I_{STD\_h}$ with grid-tied application is different from test 1 as compared in FIGS. 17 and 18.

Test 3 and test 4 are grid-tied systems having the same working conditions as shown above. No equations need extra transformation. For test 3, in step 1, $L_{fun}=10.74$ mH; in step 2, the $I_{NL\_h}$ and $I_{STD\_h}$ is as shown in FIG. 19(a); in step 3, $I_{cap\_h}$ and $I_{und\_h}$ is as shown in FIG. 19(b), in step 4, $L_{max}=6.8$ mH, and $L_{min}=4.9$ mH. $L_m=5$ mH is used in the system, and $|I_{CHB\_h}|_{ENV}$ is as shown in FIG. 19(b).

For test 4, $L_{fun}=10.74$ mH, $L_{max}=5.9$ mH, $L_{min}=4.9$ mH, and $L_m=5$ mH is used in the system. The $I_{NL\_h}$ and $I_{STD\_h}$ is as shown in FIG. 19 (a); $I_{cap\_h}$, $I_{und\_h}$ and $|I_{CHB\_h}|_{ENV}$ is as shown in FIG. 19(b).

It is important to note that the undesired current attenuation constraint is calculated based on a worst case scenario, which is rare in real-world applications. As a result, there is a large margin between the undesired harmonics and the standard requirement. As shown in FIGS. 14, 15 and 16, although inductor design only considers $I_{STD\_h}$ with $|I_{SC}/I_{rated}|\in[20, 50]$, the actual current can meet the strictest requirement in Std. 519.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

1. M. S. A. Dahidah, G. Konstantinou, and V. G. Agelidis, "A Review of Multilevel Selective Harmonic Elimination PWM: Formulations, Solving Algorithms, Implementation and Applications," Power Electronics, IEEE Transactions on, vol. 30, pp. 4091-4106, 2015.
2. A. Marzoughi, R. Burgos, D. Boroyevich, and Y. Xue, "Investigation and comparison of cascaded H-bridge and modular multilevel converter topologies for medium-voltage drive application," in IECON 2014-40th Annual Conference of the IEEE Industrial Electronics Society, 2014, pp. 1562-1568.
3. Y. Zhou and H. Li, "Analysis and Suppression of Leakage Current in Cascaded-Multilevel-Inverter-Based PV Systems," IEEE Transactions on Power Electronics, vol. 29, pp. 5265-5277, 2014.
4. Y. Chu, S. Wang, and R. Crosier, "Grid active power filters using cascaded multilevel inverters with direct asymmetric switching angle control for grid support functions," in Applied Power Electronics Conference and Exposition (APEC), 2013 Twenty-Eighth Annual IEEE, 2013, pp. 1332-1338.
5. H. Zhao and S. Wang, "A real-time selective harmonic compensation (SHC) based on asymmetric switching angle modulation and current feedback control for cascaded modular multilevel inverters," presented at the 2015 IEEE Applied Power Electronics Conference and Exposition (APEC), 2015.
6. H. Zhao, T. Jin, S. Wang, and L. Sun, "A Real-Time Selective Harmonic Elimination Based on a Transient-Free Inner Closed-Loop Control for Cascaded Multilevel Inverters," IEEE Transactions on Power Electronics, vol. 31, pp. 1000-1014, 2016.
7. Z. Hua, L. Yun Wei, N. R. Zargari, C. Zhongyaun, N. Ruoshui, and Z. Ye, "Selective Harmonic Compensation (SHC) PWM for Grid-Interfacing High-Power Converters," Power Electronics, IEEE Transactions on, vol. 29, pp. 1118-1127, 2014.
8. A. Moeini, H. Zhao, and S. Wang, "High efficiency, hybrid Selective Harmonic Elimination phase-shift PWM technique for Cascaded H-Bridge inverters to improve dynamic response and operate in complete normal modulation indices," in 2016 IEEE Applied Power Electronics Conference and Exposition (APEC), 2016, pp. 2019-2026.
9. L. Yu, H. Hoon, and A. Q. Huang, "Real-Time Calculation of Switching Angles Minimizing THD for Multilevel Inverters With Step Modulation," Industrial Electronics, IEEE Transactions on, vol. 56, pp. 285-293, 2009.
10. B. Ozpineci, L. M. Tolbert, and J. N. Chiasson, "Harmonic optimization of multilevel converters using genetic algorithms," Power Electronics Letters, IEEE, vol. 3, pp. 92-95, 2005.
11. W. Jin and D. Ahmadi, "A Precise and Practical Harmonic Elimination Method for Multilevel Inverters," Industry Applications, IEEE Transactions on, vol. 46, pp. 857-865, 2010.
12. J. N. Chiasson, L. M. Tolbert, K. J. McKenzie, and D. Zhong, "A complete solution to the harmonic elimination problem," Power Electronics, IEEE Transactions on, vol. 19, pp. 491-499, 2004.
13. L. M. Tolbert, J. N. Chiasson, D. Zhong, and K. J. McKenzie, "Elimination of harmonics in a multilevel converter with nonequal DC sources," Industry Applications, IEEE Transactions on, vol. 41, pp. 75-82, 2005.
14. Y. Liu, H. Hong, and A. Q. Huang, "Real-Time Algorithm for Minimizing THD in Multilevel Inverters With Unequal or Varying Voltage Steps Under Staircase Modulation," IEEE Transactions on Industrial Electronics, vol. 56, pp. 2249-2258, 2009.
15. M. S. A. Dahidah, G. Konstantinou, N. Flourentzou, and V. G. Agelidis, "On comparing the symmetrical and non-symmetrical selective harmonic elimination pulse-width modulation technique for two-level three-phase voltage source converters," Power Electronics, IET, vol. 3, pp. 829-842, 2010.
16. M. S. A. Dahidah and V. G. Agelidis, "Non-symmetrical SHE-PWM technique for five-level cascaded converter with non-equal DC sources," in Power and Energy Conference, 2008. PECon 2008. IEEE 2nd International, 2008, pp. 775-780.
17. A. Moeini, H. Iman-Eini, and A. Marzoughi, "DC link voltage balancing approach for cascaded H-bridge active rectifier based on selective harmonic elimination-pulse width modulation," IET Power Electronics, vol. 8, pp. 583-590, 2015.
18. M. Najjar, A. Moeini, M. K. Bakhshizadeh, F. Blaabjerg, and S. Farhangi, "Optimal Selective Harmonic Mitigation Technique on Variable DC Link Cascaded H-Bridge Converter to Meet Power Quality Standards," IEEE Journal of Emerging and Selected Topics in Power Electronics, vol. PP, pp. 1-1, 2016.
19. D. Hong, S. Bai, and S. M. Lukic, "Closed-Form Expressions for Minimizing Total Harmonic Distortion in Three-Phase Multilevel Converters," Power Electronics, IEEE Transactions on, vol. 29, pp. 5229-5241, 2014.
20. U.S. Pat. No. 4,344,123. Multilevel PWM inverter
21. U.S. Pat. No. 5,642,275. Multilevel cascade voltage source inverter with separate DC sources [2] U.S. Pat. No. 6,075,350. Power line conditioner using cascade multilevel inverters for voltage regulation, reactive power correction, and harmonic filtering.
22. Same topology and objective. But the modulation method to generate the waveform is not the same.
23. EP0336019. Multilevel pulse width modulation method, and modulator using this method.
24. M. S. A. Dahidah, G. Konstantinou, and V. G. Agelidis, "A Review of Multilevel Selective Harmonic Elimination PWM: Formulations, Solving Algorithms, Implementation and Applications," Power Electronics, IEEE Transactions on, vol. 30, pp. 4091-4106, 2015.
25. A. Marzoughi, R. Burgos, D. Boroyevich, and Y. Xue, "Investigation and comparison of cascaded H-bridge and modular multilevel converter topologies for medium-voltage drive application," in IECON 2014-40th Annual Conference of the IEEE Industrial Electronics Society, 2014, pp. 1562-1568.
26. Y. Zhou and H. Li, "Analysis and Suppression of Leakage Current in Cascaded-Multilevel-Inverter-Based PV Systems," IEEE Transactions on Power Electronics, vol. 29, pp. 5265-5277, 2014.
27. Y. Chu, S. Wang, and R. Crosier, "Grid active power filters using cascaded multilevel inverters with direct asymmetric switching angle control for grid support functions," in Applied Power Electronics Conference and Exposition (APEC), 2013 Twenty-Eighth Annual IEEE, 2013, pp. 1332-1338.
28. H. Zhao and S. Wang, "A real-time selective harmonic compensation (SHC) based on asymmetric switching angle modulation and current feedback control for cascaded modular multilevel inverters," presented at the 2015 IEEE Applied Power Electronics Conference and Exposition (APEC), 2015.
29. H. Zhao, T. Jin, S. Wang, and L. Sun, "A Real-Time Selective Harmonic Elimination Based on a Transient-Free Inner Closed-Loop Control for Cascaded Multilevel Inverters," IEEE Transactions on Power Electronics, vol. 31, pp. 1000-1014, 2016.
30. Z. Hua, L. Yun Wei, N. R. Zargari, C. Zhongyaun, N. Ruoshui, and Z. Ye, "Selective Harmonic Compensation (SHC) PWM for Grid-Interfacing High-Power Converters," Power Electronics, IEEE Transactions on, vol. 29, pp. 1118-1127, 2014.
31. A. Moeini, H. Zhao, and S. Wang, "High efficiency, hybrid Selective Harmonic Elimination phase-shift PWM technique for Cascaded H-Bridge inverters to improve dynamic response and operate in complete normal modulation indices," in 2016 IEEE Applied Power Electronics Conference and Exposition (APEC), 2016, pp. 2019-2026.
32. L. Yu, H. Hoon, and A. Q. Huang, "Real-Time Calculation of Switching Angles Minimizing THD for Multilevel Inverters With Step Modulation," Industrial Electronics, IEEE Transactions on, vol. 56, pp. 285-293, 2009.
33. B. Ozpineci, L. M. Tolbert, and J. N. Chiasson, "Harmonic optimization of multilevel converters using genetic algorithms," Power Electronics Letters, IEEE, vol. 3, pp. 92-95, 2005.

34. W. Jin and D. Ahmadi, "A Precise and Practical Harmonic Elimination Method for Multilevel Inverters," Industry Applications, IEEE Transactions on, vol. 46, pp. 857-865, 2010.
35. J. N. Chiasson, L. M. Tolbert, K. J. McKenzie, and D. Zhong, "A complete solution to the harmonic elimination problem," Power Electronics, IEEE Transactions on, vol. 19, pp. 491-499, 2004.
36. L. M. Tolbert, J. N. Chiasson, D. Zhong, and K. J. McKenzie, "Elimination of harmonics in a multilevel converter with nonequal DC sources," Industry Applications, IEEE Transactions on, vol. 41, pp. 75-82, 2005.
37. Y. Liu, H. Hong, and A. Q. Huang, "Real-Time Algorithm for Minimizing THD in Multilevel Inverters With Unequal or Varying Voltage Steps Under Staircase Modulation," IEEE Transactions on Industrial Electronics, vol. 56, pp. 2249-2258, 2009.
38. M. S. A. Dahidah, G. Konstantinou, N. Flourentzou, and V. G. Agelidis, "On comparing the symmetrical and non-symmetrical selective harmonic elimination pulse-width modulation technique for two-level three-phase voltage source converters," Power Electronics, IET, vol. 3, pp. 829-842, 2010.
39. M. S. A. Dahidah and V. G. Agelidis, "Non-symmetrical SHE-PWM technique for five-level cascaded converter with non-equal DC sources," in Power and Energy Conference, 2008. PECon 2008. IEEE 2nd International, 2008, pp. 775-780.
40. A. Moeini, H. Iman-Eini, and A. Marzoughi, "DC link voltage balancing approach for cascaded H-bridge active rectifier based on selective harmonic elimination-pulse width modulation," IET Power Electronics, vol. 8, pp. 583-590, 2015.
41. M. Najjar, A. Moeini, M. K. Bakhshizadeh, F. Blaabjerg, and S. Farhangi, "Optimal Selective Harmonic Mitigation Technique on Variable DC Link Cascaded H-Bridge Converter to Meet Power Quality Standards," IEEE Journal of Emerging and Selected Topics in Power Electronics, vol. PP, pp. 1-1, 2016.
42. D. Hong, S. Bai, and S. M. Lukic, "Closed-Form Expressions for Minimizing Total Harmonic Distortion in Three-Phase Multilevel Converters," Power Electronics, IEEE Transactions on, vol. 29, pp. 5229-5241, 2014.

What is claimed is:

1. A four-quadrant modulation method comprising:
determining the phase of a grid, wherein determining the phase of the grid comprises determining phase information of the grid;
determining switching angles $O_r$ and $O_f$, wherein (a) $O_r$ is a rising switching angle, (b) $O_f$ is a falling switching angle, and (c) $O_r$ and $O_f$ are within the whole four-quadrant $[0, 2\pi]$;
detecting switching angles $O_r$ and $O_f$ with undesired states and transforming them into practical states and leaving remaining switching angles $O_r$ and $O_f$ unchanged; and
after detecting switching angles $O_r$ and $O_f$ and transforming them, inputting the transformed switching angles $O_r$ and $O_f$ and the phase information into a logic circuit to generate driving signals.

2. The four-quadrant modulation method according to claim 1, wherein determining switching angles $\theta_r$ and $\theta_f$ comprises determining switching angles $\theta_r$ and $\theta_f$ without any limitations on a range of $\theta_r$.

3. The four-quadrant modulation method according to claim 2, wherein determining switching angles $\theta_r$ and $\theta_f$ comprises determining switching angles $\theta_r$ and $\theta_f$ without any limitations on a range of $\theta_f$.

4. The four-quadrant modulation method according to claim 3, wherein the switching angles $\theta_r$ and $\theta_f$ with undesired states are transformed to practical states by assigning new switching angles $\theta_r'$ and $\theta_f'$, wherein $\theta_r'=-\pi+\theta_r$ and $\theta_f'=\pi+\theta_r'$.

5. The four-quadrant modulation method according to claim 1, wherein the method is applied to a DC/AC inverter, an AC to DC rectifier, or a device with an AC/DC/AC topology.

6. The four-quadrant modulation method according to claim 5, wherein the switching angles $\theta_r$ and $\theta_f$ with undesired states are transformed to practical states by assigning new switching angles $\theta_r'$ and $\theta_r'$, wherein $\theta_r'=\pi+\theta_r$ and $\theta_f'=-\pi+\theta_r'$.

7. The four-quadrant modulation method according to claim 1, wherein the method is applied to a neutral point clamped (NPC) topology, a flying capacitor (FLC) topology, a cascaded H-bridge (CHB) topology, a modular multilevel topology, a modular multilevel converter, or a multi-module converter.

8. The four-quadrant modulation method according to claim 7, wherein the switching angles $\theta_r$ and $\theta_f$ with undesired states are transformed to practical states by assigning new switching angles $\theta_r'$ and $\theta_r'$, wherein $\theta_r'=\pi+\theta_f$ and $\theta_f'=-\pi+\theta_r'$.

9. The four-quadrant modulation method according to claim 1, wherein the method is applied to a multilevel selective harmonic elimination (SHE), a multilevel selective harmonic elimination and compensation (SHC), a selective harmonic mitigation (SHM), or a selective harmonic optimization (SHO).

10. The four-quadrant modulation method according to claim 9, wherein the switching angles $\theta_r$ and $\theta_f$ with undesired states are transformed to practical states by assigning new switching angles $\theta_r'$ and $\theta_r'$, wherein $\theta_r'=\pi+\theta_f$ and $\theta_f'=-\pi+\theta_r'$.

11. The four-quadrant modulation method according to claim 1, wherein determining the phase of the grid comprising using a phase locked loop to determine the phase of the grid.

12. The four-quadrant modulation method according to claim 1, wherein the switching angles $\theta_r$ and $\theta_f$ with undesired states are transformed to practical states by assigning new switching angles $\theta_r'$ and $\theta_f'$, wherein $\theta_r'=-\pi+\theta_r$ and $\theta_f'=\pi+\theta_r'$.

13. A four-quadrant modulation method, comprising:
providing a 3-cell 7-level cascaded multilevel inverter;
determining a phase of a grid of the inverter, wherein determining the phase of the grid of the inverter comprises determining phase information of the grid;
determining switching angles $O_r$ and $O_f$, wherein (a) $O_r$ is a rising switching angle, (b) Of is a falling switching angle, and (c) $O_r$ and $O_f$ are within the whole four-quadrant $[0, 2\pi]$;
detecting switching angles $O_r$ and $O_f$ with undesired states and transforming them into practical states and leaving remaining switching angles $O_r$ and $O_f$ unchanged; and
after detecting switching angles $O_r$ and $O_f$ and transforming them, inputting the transformed switching angles $O_r$ and $O_f$ and the phase information into a logic circuit to generate driving signals.

14. The four-quadrant modulation method according to claim 13, wherein determining switching angles $\theta_r$ and $\theta_f$ comprises determining switching angles $\theta_r$ and $\theta_f$ without any limitations on a range of $\theta_r$ and without any limitations on a range of $\theta_f$.

15. The four-quadrant modulation method according to claim 13, wherein the method is applied to a DC/AC inverter, an AC to DC rectifier, or a device with an AC/DC/AC topology.

16. The four-quadrant modulation method according to claim 13, wherein the method is applied to a neutral point clamped (NPC) topology, a flying capacitor (FLC) topology, a cascaded H-bridge (CHB) topology, a modular multilevel topology, a modular multilevel converter, or a multi-module converter.

17. The four-quadrant modulation method according to claim 13, wherein the method is applied to a multilevel selective harmonic elimination (SHE), a multilevel selective harmonic elimination and compensation (SHC), a selective harmonic mitigation (SHM), or a selective harmonic optimization (SHO).

18. The four-quadrant modulation method according to claim 13, wherein determining the phase of the grid comprising using a phase locked loop to determine the phase of the grid.

19. The four-quadrant modulation method according to claim 13, wherein the switching angles $\theta_r$ and $\theta_f$ with undesired states are transformed to practical states by assigning new switching angles $\theta_r'$ and $\theta_f'$, wherein $\theta_r'=-\pi+\theta_f$ and $\theta_f'=\pi+\theta_r'$.

20. The four-quadrant modulation method according to claim 13, wherein the inverter comprises six switching states.

* * * * *